US012700969B2

(12) United States Patent (10) Patent No.: US 12,700,969 B2
Hamidi-Sepehr et al. (45) Date of Patent: Aug. 4, 2026

(54) MULTIPLEXING AND JOINT DESIGN FOR COMMUNICATION AND SENSING

(71) Applicant: Intel Corporation

(72) Inventors: Fatemeh Hamidi-Sepehr, San Jose, CA (US); Thushara Hewavithana, Tempe, AZ (US); Mark Lehne, Hillsboro, OR (US); Qian Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/472,027

(22) Filed: Sep. 21, 2023

(65) Prior Publication Data

US 2024/0014976 A1     Jan. 11, 2024

Related U.S. Application Data

(60) Provisional application No. 63/409,611, filed on Sep. 23, 2022.

(51) Int. Cl.
H04L 5/00 (2006.01)
(52) U.S. Cl.
CPC .......... H04L 5/0051 (2013.01); H04L 5/0007 (2013.01)
(58) Field of Classification Search
CPC ........................... H04L 5/0051; H04L 5/0007
See application file for complete search history.

(56) References Cited

U.S. PATENT DOCUMENTS

2020/0267686 A1 * 8/2020 Hunukumbure .. H04W 72/0446
2021/0058891 A1 * 2/2021 Huang ................. H04W 64/00

FOREIGN PATENT DOCUMENTS

WO     WO-2022217167 A1 * 10/2022  ............. H04L 63/18

OTHER PUBLICATIONS

Next G Alliance, "6G Next G Alliance Report: 6G Technologies," nextgalliance.org, Jun. 2022, Washington, DC, 75 pages.
Hakobyan, et al., "Repeated Symbols OFDM-MIMO Radar at 24 GHZ," Proceedings of the 13th European Radar Conference, Oct. 5-7, 2016, London, UK, 4 pages.

* cited by examiner

*Primary Examiner* — Samina F Choudhry
(74) *Attorney, Agent, or Firm* — Alliance IP, LLC

(57)     ABSTRACT

Various embodiments herein provide techniques related to a process to be performed by an electronic device. The electronic device may: identify a plurality of downlink positioning reference signal (DL-PRS) symbols related to sensing to be performed during a sensing operation; identify a plurality of orthogonal frequency division multiplexed (OFDM) symbols related to data; generate a cellular transmission that includes a symbol repetition interval (SRI) composed of the plurality of DL-PRS symbols and the plurality of OFDM symbols; and transmit the cellular transmission. Other embodiments may be described and/or claimed.

20 Claims, 18 Drawing Sheets

Total OFDM symbol including CP

CP for OFDM symbol

Figure 17

Identifying a plurality of DL-PRS symbols related to sensing to be performed during a sensing operation
1801

Identifying a plurality of OFDM symbols related to data
1802

Generating a cellular transmission that includes a SRI composed of the plurality of DL-PRS symbols and the plurality of OFDM symbols
1803

Transmitting the cellular transmission
1804

MULTIPLEXING AND JOINT DESIGN FOR COMMUNICATION AND SENSING

CROSS REFERENCE TO RELATED APPLICATION

The present application claims priority to U.S. Provisional Patent Application No. 63/409,611, which was filed Sep. 23, 2022; the disclosure of which is hereby incorporated by reference.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 17 illustrates an alternative example wireless network, in accordance with various embodiments.

DETAILED DESCRIPTION

Figure 1:
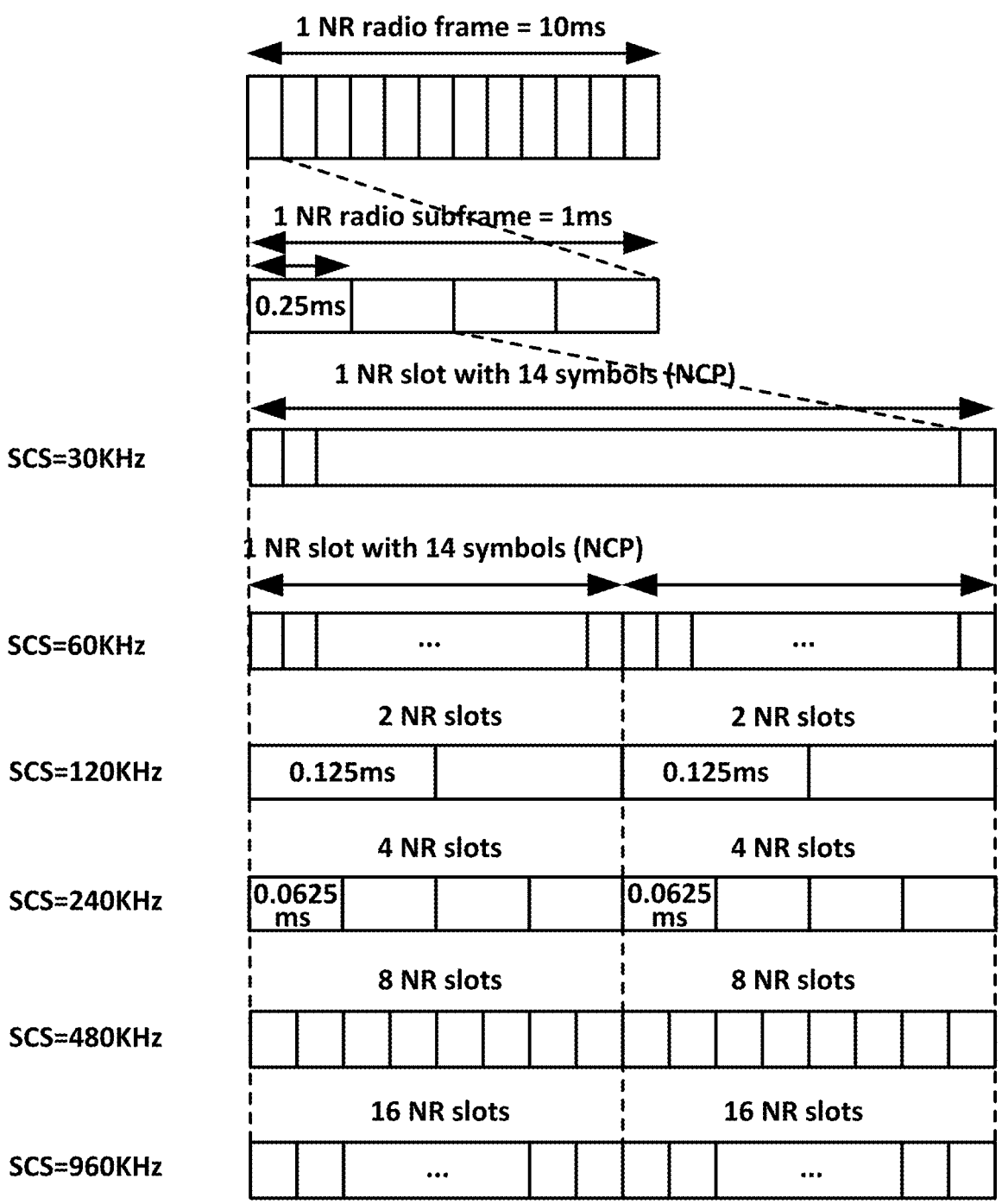
FIG. 1 illustrates example new radio (NR) numerologies and frame structure, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Joint communication and sensing (JCAS) is one technology envisioned for sixth generation (6G) communication systems to support operation of both communication and sensing functions and potentially improve the [mutual] performance with coordinated operation of the two functions.

One goal of 6G JCAS is to enable sensing functionality in a cellular communication framework, in order to support new services and applications, improve the performance of communication system with the help of sensing function, improve spectral and hardware efficiency compared to separate systems supporting of sensing and communication operations, etc. JCAS presents several unique challenges and design considerations. Regarding the coexistence of communication and sensing operations, one challenge is to have a flexible design that can operate under different communication and sensing performance and hardware/complexity tradeoffs. Resource multiplexing may be considered to be an important part of this challenge, for which, realizing the level of sharing of different resources and components between the communication system and the sensing system, plays an important role. It is noted that not all different sharing levels may be feasible, practical, or reasonable for different use-cases and deployments. For example, while for some use cases, it may be possible to avoid introducing new signal for sensing, for several other use cases, adding an additional sensing signal may be needed.

In future cellular systems (e.g., systems at or beyond legacy fifth generation (5G) and/or 6G systems), depending on various sensing applications and capabilities, JCAS operations may be base station (BS)-based, user equipment (UE)-based, or based on both BS and UE. BS-based JCAS may be considered a starting point given BS's processing power, transmission power, coverage, full-duplex capability, and multiple input-multiple output (MIMO)/beamforming support.

In the case that certain aspects or assumptions related to the mode of operation may be needed in particular example(s) of embodiments herein, such embodiments may be described with respect to BS-based JCAS. Particularly, the network based monostatic sensing architecture may be considered (if assumption regarding certain sensing mode is needed) wherein the BS uses its own transmitted signals in order to scan/monitor the environment, identify objects/ targets, etc. This may be interpreted to mean that the transmitter and receiver for the sensing node would be the same network element, i.e., same BS. The full duplex operation at the BS may be the basis for monostatic sensing, and here, it may be assumed that with advanced self-interference cancellation techniques, full duplex operation at the BS will be achievable for future cellular networks. However, it will be noted that various of the ideas and examples in the current disclosure may be applicable to the different modes of JCAS.

In the following sections, aspects with respect to the sharing of resources and components between the sensing and communication are discussed. It is assumed, for the sake of discussion of embodiments herein, that communication and sensing functions operate on the same carrier frequency band.

From the sensing perspective, for a network-based mono-static architecture, the network node may be responsible to sense the environment through reception of reflected signals from its own signal transmission. Sensing the environment may impose several requirements on the transmitted signal, which may vary significantly, depending on the particular use case. However, at its nature, and common to most use-cases, certain distance and angular domain in the environment may be illuminated, scanned, and information with respect to the existence, location, and velocity of the targets within the scanned domain [or for some use-cases, information about the medium within the scanned domain] may be derived.

The scanning/illumination of the certain angular domain (i.e., field of view (FoV)) and range domain, is achieved through transmission of radio signals, e.g., through beams, in direction of interest and strong enough to be able reach certain ranges and travel back to the transmitter. This means that enabling the required illumination/scanning and the corresponding use of time, frequency, and spatial resources, may depend on the transceiver processing capabilities, and antenna and beamforming architecture. For example, the possible extent of sharing of time, frequency, or spatial resources, and even the radio signal, between the communication and sensing operations, may greatly depend on the system processing capabilities and antenna/beamforming architecture.

In the following, aspects with respect to time domain multiplexing (TDM) between the sensing and communication for enabling JCAS based on the cellular framework, sensing frame design, sensing symbol repetition interval (SRI) formats and patterns and cyclic prefix (CP) design, as well as possible extensions to DL Positioning Reference Signal (DL-PRS) to enable reuse for sensing applications and to better adapt to the sensing needs, may be disclosed.

It will be understood that discussions in this document are not specific to a particular sensing architecture or use-case, and are kept general to the extent possible. However, whenever it is necessary to assume a particular use-case family, the smart transportation use case and its corresponding applications may be prioritized for the sake of discussion herein. For example, in derivation of the symbol repetition interval (SRI) duration and Doppler fast fourier transform

4

(FFT) sizes (K) for dimensioning the sensing block, speed requirements for traffic monitoring type of use-cases are accommodated. However, providing a specific example such as that above should not be interpreted to cause any loss of generality in the disclosed approaches.

Overview of Reuse of DL-PRS for Sensing

The following is the list of parameters to be configured for a DL-PRS resource may relate to or include one or more of the following (and/or some other parameter):

A DL-PRS Resource identifier (ID), which may define a particular DL-PRS Resource. A DL-PRS Resource ID in a DL-PRS Resource Set may be associated with a single spatial TX filter (beam), and may be transmitted from a single transmit/receive point (TRP).

A DL-PRS Sequence Identity, which may define an initialization seed for the pseudorandom Gold sequence generator for DL-PRS Resource.

A DL-PRS resource element (RE) Offset, which may define a RE offset in the frequency domain for first symbol in DL-PRS Resource. Relative RE offsets of following symbols may be defined relative to the RE offset of the first symbol in DL-PRS Resource.

A DL-PRS-Resource Slot Offset, which may define a starting slot of the DL-PRS Resource with respect to a corresponding DL-PRS-Resource Set Slot Offset A DL-PRS Resource Symbol Offset with values {0, 1, 2, . . . , 12} which may define a starting symbol of DL-PRS Resource within a slot determined by a DL-PRS Resource Slot Offset.

A DL-PRS Quasi-Colocation (QCL) Information, which may provide QCL information between a DL-PRS and other reference signals Parameters to be configured for a DL-PRS resource set may include or relate to one or more of the following (and/or some other parameter):

A DL-PRS Resource Set Identity, which may define an identity of the DL-PRS resource set configuration A DL-PRS-ResourceList, which may determine the DL PRS resources that are contained within one DL PRS resource set.

A DL-PRS Periodicity, which may define the DL-PRS Resource's (or, in some embodiments, the DL-PRS resource set's) periodicity in the number of slots. The periodicity may depend on subcarrier spacing (SCS), and may take values of $2\mu\cdot\{4, 5, 8, 10, 16, 20, 32, 40, 64, 80, 160, 320, 640, 1280, 2560, 5120, 10,240\}$ slots, with $\mu$=0, 1, 2, 3 for SCS 15, 30, 60 and 120 kilohertz (kHz), respectively. In some embodiments, all of the DL-PRS Resources within one resource set may have the same periodicity.

A DL-PRS Resource Repetition Factor, which may define how many times each DL PRS Resource is repeated for a single instance of the DL-PRS Resource Set. Values of {1, 2, 4, 6, 8, 16, 32} may be supported. In some embodiments, all DL-PRS resources within one resource set may have a same Resource Repetition Factor.

A DL-PRS Resource Time Gap, which may define the offset in number of slots between two repeated instances of a DL-PRS Resource with the same DL-PRS Resource ID within a single instance of the DL-PRS Resource Set. Values of {1, 2, 4, 8, 16, 32} may be supported.

A DL-PRS Muting Pattern, which may define a bit map of the time locations where the DL-PRS resource is transmitted or not for a DL-PRS Resource Set. The bit map size may be {2, 4, 8, 16, 32} bits long.

A DL-PRS Muting-Bit Repetition Factor, which may define the number of consecutive instances of a DL-PRS Resource Set corresponding to single bit of the DL-PRS Muting Pattern for Option 1 muting.

A DL-PRS Resource Set Slot Offset, which may define the slot offset with respect to SFN #0/slot #0 of the TRP, i.e., defines the slot where the first DL-PRS Resource of the DL-PRS Resource Set occurs, The DL-PRS Resource list, which may define the configuration for each resource in the set, as described above.

A DL-PRS Comb Size N, which may define RE spacing in frequency domain for each symbol of DL-PRS Resource. N can take the values {2, 4, 6, 12}. 1-symbol PRS has also been recently introduced with legacy comb sizes, i.e., for 1 symbol PRS, comb sizes greater than 2 and above are supported and comb size 1 is still not.

A DL-PRS Number of Symbols, defining the number of symbols per DL-PRS Resource within a slot. Values of {2, 4, 6, 12} are defined. It is noted that each PRS resource is configured with one beam, and it is not possible to have one symbol in one PRS resource with one beam and another symbol with another beam.

A DL-PRS-Start physical resource block (PRB), which may define the start PRB index as an offset from DL-PRS Point A, in multiples of 1 PRB A DL-PRS Resource bandwidth (BW), which may define the number of PRBs allocated for the DL-PRS Resource (allocated DL-PRS bandwidth), in multiples of 4 PRBs.

As can be seen from the above, the number of symbols per DL-PRS Resource within a slot may be the same for all DL PRS Resources in a DL-PRS Resource Set, and may be controlled by the parameter dl-PRS-NumSymbols and/or some other parameter.

A DL-PRS positioning frequency layer may be configured by NR-DL-PRS-PositioningFrequencyLayer, and may include one or more DL PRS resource sets. The DL-PRS positioning frequency layer may be defined by one or more of the following parameters and/or some other parameter:

dl-PRS-SubcarrierSpacing may define the subcarrier spacing for the DL PRS resource. All DL PRS resources and DL PRS resource sets in the same DL PRS positioning frequency layer may have the same value of dl-PRS-SubcarrierSpacing. The supported values of dl-PRS-SubcarrierSpacing may be similar to those provided in Table 4.2-1 of the third generation partnership project (3GPP) technical specification (TS) 38.211. In some embodiments, the supported values may be similar to the values provided in Table 4.2-1 of 3GPP TS 38.11, but may exclude the values of 240 kHz, 480 kHz, and 960 kHz.

dl-PRS-CyclicPrefix may define the cyclic prefix for the DL PRS resource. All DL PRS Resources and DL PRS Resource sets in the same DL PRS positioning frequency layer may be the same value of dl-PRS-CyclicPrefix. The supported values of dl-PRS-CyclicPrefix may be similar to those provided in Table 4.2-1 of 3GPP TS 38.211.

dl-PRS-PointA may define the absolute frequency of the reference resource block. Its lowest subcarrier may be known as Point A. All DL PRS resources belonging to the same DL PRS resource set may have a common Point A, and all DL PRS resources sets belonging to the same DL PRS positioning frequency layer may have a common Point A.

In addition to the above, all DL PRS resources sets within a DL PRS positioning frequency layer may have the same value of dl-PRS-ResourceBandwidth. All DL PRS resource sets belonging to the same DL PRS positioning frequency layer may also have the same value of dl-PRS-CombSizeN.

Mapping of DL-PRS attributes to sensing signal desired attributes may include one or more of the following:

Resource set⇆sensing block: possible durations for PRS resource set may be based on repetition parameters and the number of resources within the set, e.g., may be from one slot (if repetition factor is 1) to multiple slots.

The number of PRS resources within a PRS resource set⇆the number of beam directions in SRI: This may also determine the time gap for the repetition, to support multiple direction in SRI, and may also be related to the number of OFDM symbols [symbol pairs—since the minimum duration of a PRS resource in legacy networks may be specified to be two OFDM symbols] within SRI. Each PRS resource may be primarily dedicated to one direction, as each PRS resource may correspond to a beam from one TRP.

SRI⇆collection of one occurrence of all PRS resources within the set. For sensing, each symbol within SRI may be allocated to a different beam/direction. Also, in a PRS resource set, multiple PRS resources, each for one direction may be transmitted.

Repetition factor for PRS resource repetition within one instance of resource set⇆Doppler FFT size, k Periodicity of resource set⇆update rate for sensing Different parameters regarding DL-PRS resource set configuration and DL-PRS resource configuration may together determine the time domain pattern for DL-PRS. As such, considering the above analogies, with certain configuration of PRS resources and PRS resource set, e.g., time gap and the repetition factor, the repetitive pattern may be configured to meet the sensing needs.

The maximum number of symbols for a DL-PRS resource may be up to 12 symbols, but mapped to within a slot, and the first symbol may be symbol $0$ of a slot, i.e., it may be possible to have DL PRS starting from beginning of a slot. In future systems, allowing occupation of a full slot by PRS resources may help with realizing more flexibility in terms of the different SRI durations, and improved sensing performance. Further, different PRS resources may be mapped to different slots, while one instance of a set may contain multiple resources over multiple slots. This may also help with realizing different SRI durations for sensing.

For one-direction sensing, one PRS resource, i.e., one beam direction, and repetitions of that resource for Doppler estimation may be required. For PRS-based sensing, it may be desirable to understand how frequent the occurrence of one direction can be for Doppler processing, proper PRS configurations, etc., and with what granularity time/frequency resources for that direction can be configured.

A look into slot-level supported patterns of PRS resources, shows that within a slot, there may exist one or multiple PRS resources (of one or multiple resource sets), each with or without intra-slot-level repetition. For example, it is possible that multiple PRS resources, e.g., each of length 2 OFDM symbols (OS), may be Time-Domain-Multiplexed (TDMed) within one resource set of length one slot.

While repetition of the PRS resources may occur across slots, within the resource, also repetition of a beam is allowed. This may be mainly used for processing gain (e.g., not Doppler estimation).

Regarding SRI duration of integer multiples of slot (minimum of one-slot SRI duration), depending on the time gap being set for the PRS repetition, different SRI durations may be defined. For example, with a repetition time gap of 1 slot, and all PRS resources of the set also packed next to each other within a slot, e.g., each PRS resource may be 2-12 OFDM symbols, an SRI duration of one slot can be achieved. With a time gap of 2 slots, and all PRS resources of the set are also packed next to each other within a slot, an SRI of 2 slots may be achieved wherein only within the first slot of the SRI, the sensing transmission takes places. The same logic may apply for larger time gaps, leading to lower Doppler/speed detection. Essentially, the resulting PRS resource set duration, i.e., equivalent of sensing frame duration, may be equal to (repetition factor)*(time gap). For sub-slot level SRI duration, special handling and extensions may be required.

For multi-directional sensing, multiple PRS resources, i.e., multiple beam directions, and repetitions of those resource for Doppler estimation may be required. Depending on how different resources of a single or multiple resource sets are located, SRI may be defined differently. Even though sub-slot-level SRI may also be made possible with PRS, the structure of PRS may allow for limited number of directions to be covered within one SRI and certain extensions for DL-PRS are required to enable more flexibility. For SRI durations of integer multiples of slots, similar to the one-directional sensing case, if multiple PRS resources of the same resource set are TDMed within one slot, and if all resources of a set fit in a slot, the minimum SRI duration of one slot may be achieved. Depending also on the time gap set for the repetition, different SRI durations may be defined. Further, if a PRS resource set contains resources over multiple slots, either one slot per resource, or mix of slots with single and multiple resources, SRIs over multiple slots may be also defined, effectively for lower Doppler estimations.

Overview of Sensing Frame Structure Design

The signal used for sensing, may enable or relate to one or more of the following objectives, and/or some other objective:

Detection, and estimation of the range, velocity and/or angle of targets via baseline Rx processing (e.g., two-dimensional (2D) map/periodogram) of reflected radar signals (within certain ranges and with certain resolution and accuracy)

Efficient flexible multiplexing between communication and sensing: Baseline solution for JCAS is to enable TDM of communication and sensing as the default multiplexing mode, considering communication transmission opportunity availability, communications latency, resource efficiency, etc.

Efficient handling of interference between sensing signals of different sources and between communication and sensing.

Such objectives may require certain time/frequency attributes, and help determine sensing signal properties and parametrization. For the sake of discussion herein, one may assume SCS denotes the Sub-Carrier Spacing, K is the slow (Doppler) FFT size, OS denotes the OFDM Symbol, and SRI is the Symbol Repetition Interval. Accordingly, the following SRI values and Doppler FFT sizes may help support the highest possible capabilities for velocity estimation under different limitations, and to meet finer velocity resolutions, while keeping the design as simple as possible (without compromising supported sensing performance). Particularly, For all carrier frequencies in frequency range 1 (FR1), the following SRI and Doppler FFT sizes (K) to be supported may include:

For SCS=15 KHz, {SRI, K}={7OS, 32}, {7OS, 64}

For SCS=30 KHz, {SRI, K}={14OS, 32}, {14OS, 64}, {7OS, 64}, {7OS, 128}

For SCS=60 KHz, {SRI, K}={28OS, 32}, {28OS, 64}, {14OS, 64}, {14OS, 128}

These may result in a sensing block duration equal to SRI*k=16, 32 milliseconds (mse)c.

For frequency range 2 (FR2), SRI and Doppler FFT sizes (K) to be supported may include:

For SCS=60 KHz, for all carrier frequencies in FR2, {SRI, K}={7OS, 64}, {7OS, 128}, which results in sensing block duration=SRI*K=8, 16 msec. Further, for frequency<30 gigahertz (GHz) in FR2, {SRI, K}={14OS, 32}, {14OS, 64}, {14OS, 128} may also be supported, resulting in sensing block duration of 8, 16, 32 msec. For frequency>50 GHz in FR2, {SRI, K}={7, 256} is also supported, resulting in sensing block duration of 32 msec.

For SCS=120 KHz, for all carrier frequency in FR2, {SRI, K}={14OS, 64}, {14OS, 128} are supported, resulting in sensing block duration of 8, 16 msec, and {SRI, K}={7OS, 64}, {7OS, 128} may also be supported, resulting in sensing block duration of 4, 8 msec. Further, for carrier frequency>50 GHz in FR2, K=256 is also supported, resulting in sensing block duration of 32, 16 msec for SRI=14, 7OS, respectively.

As used herein, the term Frequency Range 1 (which may be abbreviated as "FR-1, "FR1," etc.) and/or Frequency Range 2 (which may be abbreviated as "FR-2," "FR2," etc,) may refer to frequency bandwidths as defined by the third generation partnership project (3GPP), for example in technical specification (TS) 38.104, whether as previously defined, as defined at the time of filing of the present document, or as may be defined at some future time. In some specific embodiments, Frequency Range 1 may refer to frequency bandwidths between approximately 410 Megahertz (MHz) and approximately 7125 MHz. In other specific embodiments, Frequency Range 1 may refer to frequency bandwidths that are less than or equal to approximately 6000 MHz. Similarly, in specific embodiments, Frequency Range 2 may refer to bandwidths between approximately 24250 MHz and approximately 71000 MHz. In some embodiments, bandwidths between approximately 24250 MHz and approximately 52600 MHz may be referred to as Frequency Range 2-1 (which may be abbreviated as "FR2-1," "FR 2-1," etc.). Bandwidths between approximately 52600 MHz and approximately 71000 MHz may be referred to as Frequency Range 2-2 (which may be abbreviated as "FR2-2," "FR 2-2," etc.).

The number of OFDM symbols in the SRI, may provide a good a balance between the maximum detectable speed, the sensing repetition gain, the flexibility/capability to support multiplexing between sensing and communication, the field-of-view (FoV) coverage (depending on the required number of beams, and the beamwidth). Further, as can be seen from the proposed values above, the Doppler FFT sizes are generally smaller is FR1, which involves fewer number of radio frames for sensing and less limitation and unavailability for communication. Also, the PRS configuration may be extended to allow single-symbol PRS resource, to accommodate larger number of symbols or more PRS resources (and directions) within SRI, for better FoV coverage, and/or better processing gain, as well as more flexibility in terms of multiplexing of communication and sensing symbols.

In the above-described cases, the cyclic prefix (CP) durations may be the same as in NR, and may be assumed for OFDM symbols used for sensing. In case of using different CP (and hence symbol duration) between communication and sensing (which may be motivated if there is a need to support longer sensing ranges (>100 m) with higher SCSs in FR2), proper alignment between sensing block durations and communication slot boundaries may be desired. On the other hand, given that normal CP of NR supports up to ~90 meters (m) inter-signal interference (ISI)-free range detection, for 120 kHz SCS, and considering the fact that for millimeter wave (mmWave), the power range (link-budget) may not allow more than 100 m (even 100 m for some practical deployments may be too far, e.g., rooftop looking around the block), support of longer-range use cases (UCs) with FR2, may not be fully justified (especially, as the longer-range UCs can be supported with FR1 with less complications). In any case, handling of different symbol and CP durations between communication and sensing, may be discussed in more details later in this document.

Observations on Supported UCs Over FR1 and FR2

Based on the above analysis, observations on different UC requirements supported over FR1/FR2 may include one or more of the following:

FR1 supports mid-high speeds (~120 kilometers/hour (km/h)) and/or long ranges (max 180-350 m), with a same CP & OFDM symbol length between C and S. FR1 can support range resolution at the best of ~0.5 m (with contiguous CA). Given the deep market penetration of FR1 mid-bands, FR1 may be supported for any sensing UC with longer range or higher angular resolution cases (FR1 will support larger arrays with more MIMO layers in future cellular system generations, which may lead to high angular resolution and can be more important at longer sensing ranges). For example, a next generation FR1 BS may start with 16×16 MIMO as a minimum, supporting an angular resolution of <1'). On the other hand, higher signal-to-noise ratios (SNRs) may come from large number of chains, requiring less number of repetitions for a certain processing gain, leaving more resources for communication.

Lower carrier frequencies in FR2 may be suitable to support either (mid-range, mid speed) [with 60 KHz] or (mid-range, high-speed) [with 120 KHz], or (low-range, very-high-speed) [with SCS>120 KHz]. For example, FR2 (<30 GHz) with SCS=60 kHz, may only be suitable for UCs which do not require max speed higher than 80 km/h, while SCS=120 kHz, may be suitable for UCs with max speed ~150 km/h.

Higher carrier frequencies in FR2, are suitable to support either (mid-range, low-speed) [with 60 KHz] or (mid-range, mid-speed) [with 120 KHz] or (low-range, high-speed) [with SCS>120 KHz]. For example, FR2 (>30 GHz) with SCS=60 KHz may be suitable for max speed <50 km/h, and with SCS=120 KHz, may be suitable for UCs which do not require max speed higher than ~120 km/h.

TDM Between Communication and Sensing as the Baseline (Informative Text)

It is noted that, in certain conditions, it may be possible to [re-]use the communication signal (either data or some reference signals) also for sensing (i.e., if spatial direction of the communication and radar transmissions aligns, or if BF/antenna architecture/HW allows for simultaneous comm and sensing in different directions) and rely on the communication waveform parametrization. However, such situation may not be always available, and this may not be considered as the baseline for JCAS for different use-case scenario. Further, it should be noted that depending on the use case (UC) requirements, sensing performance in such situation may be sub-optimal and compromised (due to the opportunistic nature). As such, TDM of sensing and communication signals/symbols is supported as the baseline operation of the sensing and communication functionalities. This does not preclude any other means of multiplexing, but establishes the necessity of at least supporting TDM, between the two functions.

TDM between communication and sensing, also includes the cases where it is possible to extend/generalize some particular types of reference signals with dedicated time (/frequency) resources. Particularly, the term TDM here, encompasses the case of dedicating specific time resources for the purpose of sensing, and this may be achievable either with adaptation/extension of some reference signal for the particular sensing use-case, and/or with introducing new dedicated sensing signal (in both cases, the communication data signal may be multiplexed with the signal used for sensing).

In general, motivations for supporting TDM between sensing signal and communication signals may include one or more of the following:

A TDM design enables controlling sensing direction independent of comm direction and ensure certain sensing performance rather than limiting to comm signal availability in a given direction. Particularly, due to transmit beamforming/architectural limitations in cellular systems, simultaneous transmission in different directions (i.e., either in different subcarriers (i.e., frequency domain multiplexed—FDM) via digital beamforming or in spatial domain multiplexing (SDM) via multi-panel transmission), may not be possible or practical. On the other hand, analog/hybrid beamforming may prevent sensing to rely on the communication signals, or the sensing signal to carry data, as often, there may be no active user that can be served by a respective beam (particularly with narrow beams). This also motivates introduction of the sensing signal (which may also be muted if a communication signal available in a given time/direction). For a JCAS system, this motivates a time domain multiplexing design, to enable controlling the sensing direction independent of the communication direction and ensure certain sensing performance rather than limiting to the communication signal capability and availability in a given direction. Regarding this last point, it is noted that certain time domain characteristics and pattern, is needed for reasonable sensing performance. By only relying on resources where the communication does or does not transmit, the sensing performance is compromised. It is also noted that TDM is needed regardless of whether there are multiple transmission beams or not. Particularly, while in the TDM design, we need to consider how to multiplex the beams, but the need for multiplexing the beams is not the primary reason that motivates TDM.

Compared to the frequency domain multiplexing (FDM) of sensing and communication signal, if possible (e.g., due to beamforming limitations), TDM does not compromise the bandwidth which is critical for sensing range resolution. Of course, by FDM of sensing signals, it is also possible to support comb-structure and spread over the whole bandwidth, but this may introduce some limitations with respect to the range ambiguity.

TDM may enable better use of system resources, since when there is no communication signal, the resource can be used for sensing, and vice versa. Also, if the resource is primarily allocated for sensing (e.g., within a sensing block), it may be also possible to opportunistically accommodate communication signals (e.g., with intra-frame-level TDM).

TDM can allow different waveform parametrization/numerologies between communication and sensing.

Compared to spatial domain multiplexing (SDM), TDM (e.g., with analog beamforming or without beamforming at the transceiver), provides better possibility to avoid inter cell interference which would happen in case of using multiple beams at the same time, e.g., with multi-panel transmission or with digital beamforming.

In case of the hardware design wherein antenna array elements can be swapped between Tx and Rx (i.e., partitioning a same set of antennas to TX and RX for sensing operation), TDM allows for full use of antenna array elements available at transceiver. Particularly, with simultaneous communication and sensing, for monostatic sensing, part of the available spatial elements in such implementations may be dedicated to sensing Rx, i.e., even for communication, a reduced number of elements would be left available for TX.

Note: If sensing in wireless systems is enabled via re-use of PRS signals (or the extension of such signals), then TDM of the sensing and the communication signals [other than the positioning signals which may be currently consider as part of the legacy communication signals for non-data transmissions] are naturally achieved.

Different Levels of Communication and Sensing TDM

Figure 2:
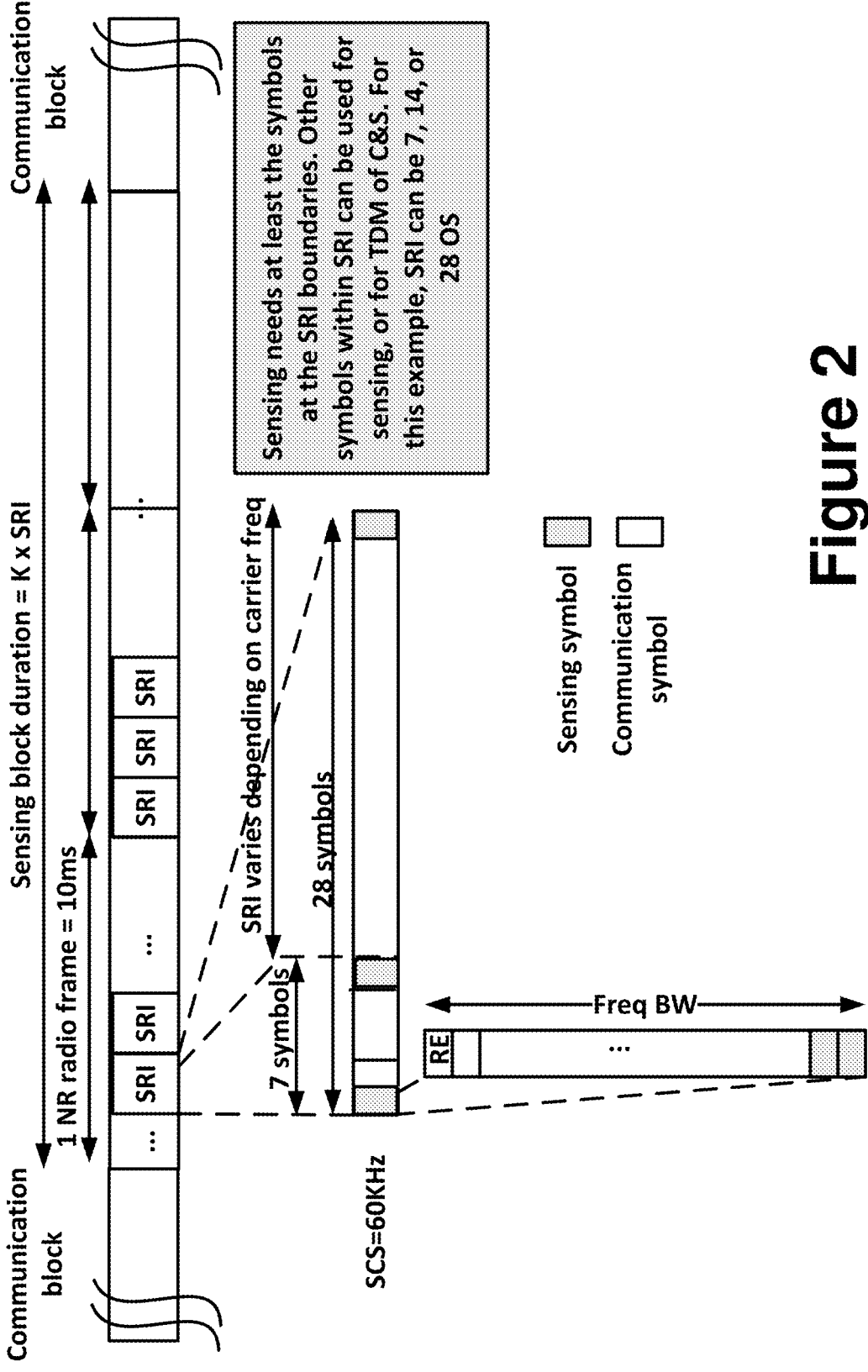
FIG. 2 illustrates an example of sensing and communication blocks, in accordance with various embodiments.

A communication block can be defined by the overall time interval over which, no sensing symbol is taking place. The communication block's boundaries are aligned with some known time units (symbol, slot, subframe, or frame as defined in NR (FIG. 1)). Similarly, a sensing block is defined by the time interval within which, at least some symbols are used for sensing with certain pattern (e.g., the sensing block may start and end with sensing symbols, and in between, depending on the SRI, etc., some symbols are also dedicated to sensing) (FIG. 2). The sensing block's boundary may be aligned with the communication block's boundary, at some NR-based units (this may be a bit compromised, leading to small time gaps in between sensing and communication block, in case the CP and OFDM symbol duration are different between sensing and communication, as will be discussed later).

Based on the different SRI durations and sensing frame durations, there can be different levels of TDM between communication and sensing symbols. Particularly, the TDM is possible either at block-level or intra-block level (intra-SRI-level). Depending on whether within SRI, all time resources (OFDM symbols or slots) are dedicated to sensing or they shared between the sensing and communication, it is possible to realize block-level or intra-block-level TDM. Accordingly, operation over FR1 and FR2, and different numerologies may motivate different levels of TDM. Within a sensing block, all SRIs need to follow the same pattern/placement and number of sensing symbols. As such, the intra-block TDM implies intra-SRI TDM, as all SRIs should look the same (in terms of pattern and number of communication and sensing symbols, as well as the covered beam directions over sensing symbols) across the entire sensing block duration.

There are certain necessary conditions to enable intra-SRI-level TDM, which may include one or more of the following:

Having unified numerology/CP between communication and sensing symbols, i.e., communication CP and SCS also meet the desired UC sensing range and speed performance. This condition is due to the otherwise high complexity needed to deal with different OFDM symbol durations within an SRI to ensure efficient system operation as well as efficient resource usage. For block-level TDM, the communication and sensing blocks can have different numerologies and bandwidths, if they are at least boundary aligned at the level of some communication units.

For a given maximum detectable speed, the SRI is large enough to fit in multiple OFDM symbols.

From FoV/beamwidth, and/or link budget perspective, not many of the symbols available within the SRI are needed for sensing. For example, considering the FR2's link budget and the desired processing gain, as well as the narrower beamwidths in higher carrier frequencies which lead to requiring multiple beams (each to be transmitted on an OFDM symbol assuming analog/hybrid beamforming) to cover the required FoV, it may be required to dedicate all symbols within the SRI to sensing. For such scenarios, block level TDM of communication and sensing seems the feasible option. On the other hand, for FR1, a given FoV can be covered within one or few OFDM symbols. Particularly, it is possible to create a wide beam covering the FoV, and with beamforming, the beamwidth can be made large, such that a few beams may cover the FoV, e.g., over same frequency resources similar to MU-MIMO, or via comb-FDM by digital beamforming. This enables possibility of intra-block-level TDM of communication and sensing.

Enabling intra-SRI-level TDM of communication and sensing, can provide more frequent transmission opportunities for communication, resulting in less latency caused by the sensing, and also enables more efficiency in terms of using resources. For block-level TDM, from the communication perspective, the sensing block may mean unavailability of transmission opportunity. Intra-SRI-level TDM of communication and sensing may also simplify using the communication signal for sensing whenever available and possible (in terms of direction, etc.).

TDM of Communication and Sensing Over FR1 and FR2

Considering the necessary conditions for support of intra-block TDM, as well as the proposed SRI values for FR1 scenarios, for FR1, both block-level and intra-block-level TDM can be supported. For FR2, block-level TDM should be at least supported. Further, considering the previously discussed conditions for enabling intra-block-level TDM, for lower SCSs in FR2, the SRI duration is few OFDM symbols. For wider FoV scan, all symbols in the SRI may be needed for the purpose of sensing. As such, there may not be much motivation to support intra-SRI-level TDM. Instead, these cases would require dedicated sensing block, and block-level TDM of communication and sensing. On the other hand, for narrow FoV scan, it may be possible to also allow for few communication symbols within the SRI. For higher SCSs in FR2, larger number of OFDM symbols may fit within the SRI duration, which may accommodate the required number of beams to cover the FoV, while the rest may also be assigned for communication. However, for higher SCSs, it is not always possible to have a unified numerology between the sensing and communication, since the CP duration for communication can be too short to meet the longer detectable range requirements, depending on the use-case. For use cases requiring longer ranges (requiring different OFDM symbol duration between communication and sensing), intra-SRI-level TDM may not be supported. These cases need dedicated sensing block, and block-level TDM of communication and sensing. Further, due to mis-aligned symbol durations, the challenge is in defining the sensing block in integer number of sensing symbols and slots, which can be closely aligned with communication time frame boundaries such as slot, subframe, frame, etc. For short-range UCs intra-SRI-level TDM may be supported over FR2, if the FoV requirement and the link-budget allow for no or a few intra-SRI sensing symbol repetitions, so that within an SRI, there are some symbols left for communication as well. Given the FR2 sensing link-budget and the narrower beam operations, meeting these conditions may be limited to fewer UCs.

Embodiment 1: Defining Sensing Blocks

Future cellular systems which support JCAS, may allow configurable CP length for SCS≥120 KHz to enable longer-range UCs. For example, for SCS=120 KHz, the sensing OFDM symbol duration can be configurable between {8.92, 8.92+X} us, where X can be selected depending on the range requirements. For example, X=0.2 us results in OFDM symbol duration of 9.12 us and considering same useful symbol duration across different total OFDM symbol durations (due to the same SCS), this means a CP duration of 0.79 us for the sensing (compared to CP duration of 0.59 us in NR SCS=120 KHz), accommodating up to ~120 m ISI-free range detection. For SCS=480 KHz, while the communication OFDM symbol duration is 2.23 us, the sensing OFDM symbol duration can be configurable between {2.23, 2.23+X} us, where X can be selected depending on the range requirements. For example, X=0.63 us results in OFDM symbol duration of 2.86 us and con-sidering same useful symbol duration across different total OFDM symbol durations (due to the same SCS), this means a CP duration of 0.79 us for the sensing (compared to CP duration of 0.146 us for communication for SCS=480 KHz), accommodating up to ~120 m ISI-free range detection.

For each of such cases, it is then necessary to select proper values for sensing block duration in order to enable closest possible alignment with communication unit boundaries, although some small gap between the sensing block and the communication block may be eventually unavoidable.

For example, for SCS=120 KHz with sensing OFDM symbol duration of 9.12 us, in order to address speed requirements resulting in SRI durations on the order of 7*8.92 us, or 14*8.92 us (as discussed above), one may fine tune and select SRI equal to 6*9.12 us or 13*9.12 us, considering the sensing OFDM symbol duration. Then, with k=64, the sensing block duration will be 3.5 msec or 7.6 msec, respectively, which amounts to 393 or 851 commu-nication OFDM symbols, respectively. This means the sens-ing block duration will be equal to 28 slots and 1 commu-nication OFDM symbol or 60 slots and 11 communication OFDM symbols. As such, the sensing block duration may not end up being an integer number of communication slots, and certain slots may need to accommodate both sensing OFDM symbols and communication OFDM symbols. On the other hand, this may not be favorable form the system dimensioning and frame design perspective. It may be then preferred to define the sensing block duration in terms of integer number of communication slots. As such, one approach, is to allow for a set of values in terms of the number of slots to be defined, from which one value can be configured as the sensing block duration, and let the sensing entity select the sensing symbol duration and the SRI duration within the block, considering the configured total sensing block duration, the carrier frequency, the speed requirements, the FoV requirements, the link budget, etc. For example, for SCS=120 KHz, 480 KHz, sensing block duration can be configured form the set {2, 4, 8, 16, 32} msec (this does not mean to preclude any other value) or from the set {32, 64, 128, 256} slots (or any other values, not necessarily powers of 2), and the SRI can be selected based on the several factors mentioned earlier. As such, here, the main design parameter would be the sensing block duration to ensure proper alignment with communication block, as compared against the cases with unified numerology between communication and sensing, wherein the selection of SRI and supported Doppler FFT sizes are the main design parameters. In summary, for different communication and sensing OFDM symbol durations, only block-level TDM is supported, wherein the sensing block should be aligned with some known boundaries in communication (e.g., slot) and the rest of the parametrization may be left up to the imple-mentation. It is also noted that a gap between the sensing block and the communication may still exist, as the duration of the sensing block is not an integer number of sensing symbols. The implementation may attempt to minimize this gap, and increase efficiency in system's resource usage.

In one embodiment, the specification supports time inter-vals over which the base station can perform any UE-transparent transmit and/or receive processing, while the UEs can also perform its required processing or measure-ments. Such intervals give the base station also the flexibility to perform sensing, without any concern regarding config-uring UEs to receive its signal and having to align symbol and slot boundaries, etc. The indication of such intervals can be explicit, or implicit via certain configurations of DL-PRS, e.g., via the CP configuration parameter, to let the UE know that within such intervals, the OFDM symbol duration and/or the slot boundaries may not be aligned with what has been defined and used for communication. For example, certain CP durations (larger than what used for communi-cation, for SCSs>=120 KHz) can be configured only when such intervals are to be indicated.

In one embodiment, for SCS=120 KHz, the OFDM sym-bol duration is kept the same, e.g., it equals 8.92 us as the current value in NR or other values, while the CP duration for DL-PRS signal can be configured depending on the sensing detection range requirements. For example, a set of CP durations including the legacy value of 0.59 us, and one or more larger values (e.g., 0.69 us (for ~100 m range detection), 0.79 us (for ~118 m range detection), or any other value) can be defined, and the configuration can indicate one of the predefined values per PRS resource or per PRS resource set. While such design degrades the energy effi-ciency as the CP loss increases (CP to useful symbol duration ratio increases), and hence, the link budget, but it allows for more straightforward sensing frame design, since the symbol boundaries and slot boundaries are easily aligned with the current boundaries defined for the communication. Further, the link budget impact can be addressed by lever-aging the processing gain, e.g., via time domain repetitions, and/or use of increased PRS signal bandwidth (e.g., using bandwidth aggregation, etc.).

In one example, the DL-PRS configuration supports con-figuration of SCS=240 KHz or SCS=480 KHz, over FR2.

In an extended example, for SCSs>120 KHz, CP can be configured from a predefined set including the CP duration used for communication, as well as other larger value(s), while the total OFDM symbol duration is kept the same for all different CP durations.

It is noted that, defining different blocks of symbols with different CP durations is already possible for SCS=60 KHz in NR, e.g., a slot with extended CP (ECP) or a slot with normal CP (NCP). The NCP is specified for all subcarrier spacings. ECP is currently only specified for the 60 kHz subcarrier spacing. If normal CP (NCP) is used, the CP of the first symbol present every 0.5 ms is longer than that of other symbols.

Currently, for SCS=60 KHz, the NR slot and radio frame/subframe design is such that the normal CP duration for the 0th and 28th OFDM symbols is 1.69 us, while for the other OFDM symbols, it is 1.17 us, and there are 14 OFDM symbols within each slot. On the other hand, the extended CP is 4.17 us, and there are 12 OFDM symbols within the slot of extended CP. Given that the useful OFDM symbol duration is 16.67 us for SCS=60 KHz, two slots of normal CP symbols occupies 17.84*27+(16.67+1.69)=500.04 us, while two slots of extended CP symbols occupies 24*(16.67+4.17)=500.16 us. As such, the two types of slots, are almost boundary aligned at every half-subframe (~0.12 us difference). If for normal CP, all the symbols had the same CP of 1.17, then every two slots would occupy 499.52 us, which would result in a gap of ~0.5 us with respect to the half-subframe boundaries.

In one embodiment, the DL-PRS configuration supports configuring CP duration, e.g., from a few options, for each SCS=>60 KHz, such that the overall OFDM symbol duration also varies based on the CP duration. For 60 KHz, the set of the CP durations can include NR normal CP and NR ECP, or any other values.

For SCS=120 KHz, only normal CP is currently defined in NR, which equals 1.11 us for the 0th and 56th OFDM symbols, and 0.59 us for the other OFDM symbols.

In one example, an extended CP is also defined for SCS=120 KHz (and higher SCSs if needed), and the DL PRS can be configured to use extended CP for SCS=120 KHz (and higher SCSs if needed) as well. The ECP calculation for SCS=120 KHz can be such that 4 slots of normal CP (with one large CP every 4 slots) with 14 OFDM symbols per slot, equals 4 slots of extended CP with 12 OFDM symbols per slot. This results in and extended CP of 2.0875 us.

8.92*55+(8.33+1.11)=500.04    us=4*12*(8.33+ECP)
➔ ECP=2.0875 us.

Such design results in easy alignment of the slot boundaries, while the extended CP is larger than what would be needed for the desired range detection (given the link-budget, etc.). On the other hand, if the ECP for SCS=120 KHz is defined just to meet sensing detection needs so that the resources can be better used, the alignment of slot boundaries will be more challenging.

In one example, the DL-PRS configuration supports configuring CP duration, e.g., from a few options, for each SCS=120 KHz, such that the overall OFDM symbol duration also varies based on the CP duration. The set of the CP durations can include NR normal CP and NR ECP as defined above, or any other values.

In one embodiment, instead of defining ECPs, e.g., for SCS=60 or 120 KHz, such that each NCP slot boundary is aligned with ECP slot boundary, for higher resource and energy efficiency, the ECPs are defined such that one or multiple of following are boundary aligned:

half slots an integer number of ECP OFDM symbols and another integer number of NCP OFDM symbols, where the integer numbers may not be an integer multiple of slot durations in number of OFDM symbols half subframes subframes radio frames.

In one example, the DL PRS signal can be configured for transmission over the above duration over ECP OFDM symbols. Particularly, DL PRS resources of one or multiple DL PRS resource sets can be configured over any of the ECP OFDM symbols in the boundary aligned duration, and each DL PRS resource can span over 1 or 2 or multiple consecutive ECP OFDM symbols. The DL PRS resource set can be configured such that it contains the required number of DL PRS resources to scan the desired field of view over one instance of the set, and the set is repeated within the boundary aligned duration or an integer multiple of this duration. If needed any of the ECP symbols can also be used for transmission of other communication signals.

In one embodiment, for SCS>=120 KHz, every m NCP slots (e.g., where m can be chosen to align with a subframe or frame boundary or some other time unit), are matched to every n (newly defined) extended CP symbols (where both NCP and ECP can be different (larger) for the first symbols within m and n symbols, respectively). The ECP (and NCP if necessary) is (are) selected based on the underlying use-case's requirements in terms of the range detection.

In one example, for SCS=120 KHz, every 4 NCP slots, i.e., every 56 NCP OFDM symbols, are matched to every 54 extended CP symbols (where both NCP and ECP can be different for the first symbols within 56 and 54 symbols, respectively). For example, selecting an extended CP for SCS=120 KHz based on the required range detection, e.g., ECP=0.92 us or any other value selected to meet the range detection requirements, the one extra extended CP every 54 symbols can be calculated according to the following equation:

$$500.04 - (47+6)*(8.33+ECP) - 8.33.$$

This defines a subframe of extended CP (with the first symbol having extra extended CP duration), which is boundary aligned with a subframe of normal CP. The DL PRS resources and the DL PRS resource set(s) can then be configured over this ECP OFDM symbols within this subframe duration.

Similar design can be extended for higher subcarrier spacings, e.g., SCS=240 KHz, if needed as well.

In one embodiment, instead of all PRS resource sets defined in the PRS positioning frequency layer being configured with common SCS (15, 30, 60, or 120 KHz), and common CP (CP for all DL PRS resource sets in a PRS positioning frequency layer, can currently be specified as 'normal' or 'extended'), one or both of these parameters can be configured per DL PRS resource set, or per DL PRS resource. For example, the parameter dl-PRS-CyclicPrefix and/or the parameter dl-PRS-SubcarrierSpacing can be one of the parameters describing the DL PRS resource or the DL PRS resource set.

For example, if an instance of PRS resource set (i.e., a single occurrence, without the repetitions) spans over multiple slots, the resources within different slots, do not need to have same CP. Then the granularity of configuring the CP at the PRS resource level can be useful, and the configuration should ensure accommodating the same CP in each slot (if multiple CP types within a slot is not supported). Alternatively, configuration can allow 'per slot' granularity of CP configuration, e.g., for a PRS resource set spanning over multiple slots, the configuration allows for normal CP in one slot, and extended CP in another slot. In one example, for configuration of each PRS resource set, a vector of the length equal to the number of spanned slots, can be defined, each element of the vector showing the type of CP over each of the spanned slots. In an extended example, the configuration of CP is not limited to normal and extended CP, but indicates an index to a value from a larger set of predefined values.

Considering the sensing application using PRS signal, to scan over a certain bema direction (i.e., a certain PRS resource), same CP needs to hold over all the SRIs across the sensing frame. On the other hand, all the directions to be scanned/sensed, may not necessarily need same CP. For example, over a certain direction, a longer range may need to be scanned, while in another direction, due to the blockages and obstacles only shorter ranges may need to be scanned.

Currently, NR only supports the extended CP for SCS=60 KHz, and it does not support a slot with half duration occupied by symbols with extended CP, and half occupied by symbols with normal CP. In an example of future systems, slots containing symbols with different CP duration is also supported. Especially when each slot duration contains even number of symbols with normal CP (i.e., 14) and even number of symbols with extended CP (i.e., 12), half of the slot can be filled with ECP symbols, and half with NCP symbols (while the NCP and the ECP symbols may not necessarily be all adjacent to each other, but if each half slot contains similar CP type, it avoids additional complexity in processing). Overall, this design can introduce additional complexity on the transceiver processing, and may only be supported for certain scenarios with tight KPI requirements. At least for baseline extension of NR PRS, it is sufficient that the directions that are scans consecutively (in time domain) (i.e., the PRS resources) within a slot duration (or even larger duration as disclosed above), have the same CP.

Embodiment 2: SRI Formats and Patterns

In one embodiment, as the baseline mode of operation, same configurable number $N \geq 1$ OS in (each and every) SRI within sensing frame is dedicated for sensing, with the same pattern for distribution of the sensing symbols within (each and every) SRI is supported.

Assuming a fixed number of N symbols across SRIs in the sensing block is supported, different selections of symbols within SRI are still possible (FIG. 3), e.g., consecutive N symbols, interleaved N symbols, etc. This impacts the flexibility of multiplexing with communication symbols, how immediate a communication packet may find transmission opportunity, as well as [potentially,] the sensing performance and latency (e.g., also depending on whether some of the sensing symbols are used for repetition of the same beam within the SRI or they are all pointing to different directions, etc.). For example, considering different sensing scenarios, consecutive N symbols may or may not have benefits over interleaved N symbols. For example, (to also avoid unnecessary scheduling complexity) SRIs pattern can be configurable (depending also on the communication service to be multiplexed with sensing), e.g., either from a set of pre-defined patterns, or the configuration can be through a bitmap to indicate which symbols within the SRI should be used for sensing. For example, considering VOIP or URLLC traffic (SPS/CG type of communication), configuration similar to the example case in the bottom of FIG.

Figure 3:
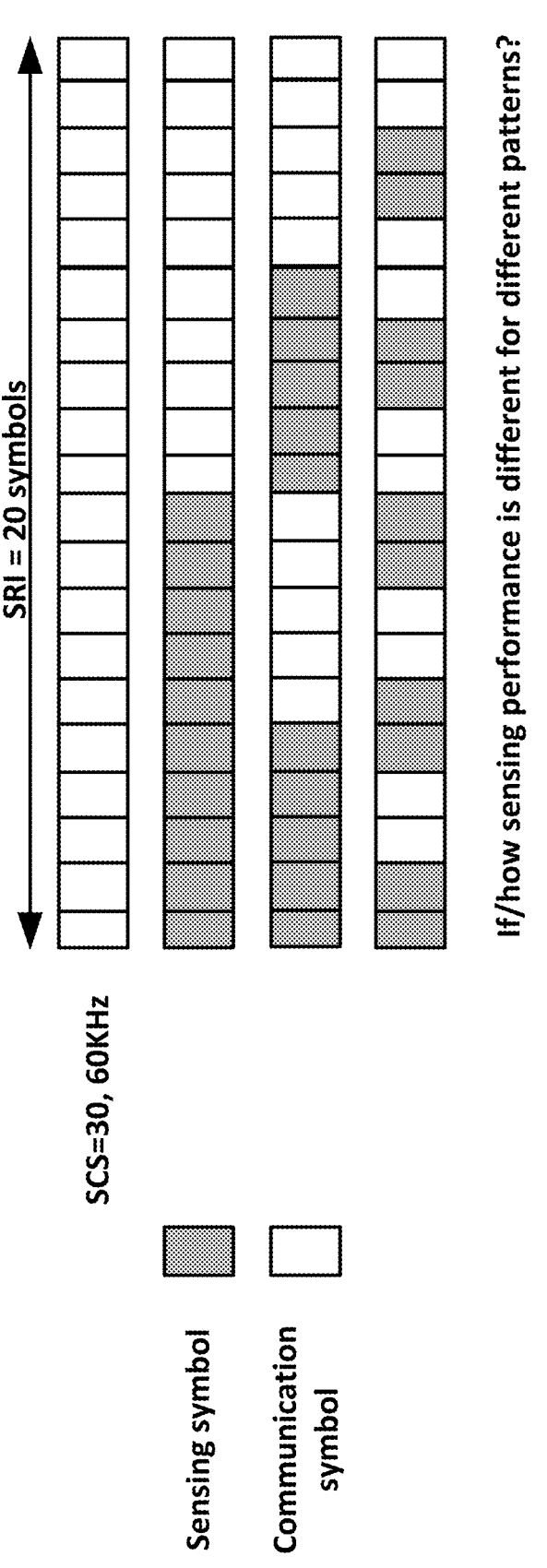
FIG. 3 illustrates an example symbol repetition interval (SRI) structure in terms of sensing and communication symbols, in accordance with various embodiments.

3 may be more beneficial, but for larger communication packet sizes, configuration similar to the example case in the top of FIG. 3 may be more suitable. That is a main motivation for allowing more flexibility from the communication perspective.

In one example, DL PRS resource set configuration supports predefined patterns for time domain allocation of the DL PRS resources, and indication to the selected pattern for the particular set being configured. This can help reduce the configuration overhead, e.g., since the time domain attributes of each resource within the set would not need to be specified. Alternatively, the pattern configuration can be indicated through a bitmap to indicate which symbols within the SRI should be used for transmission of PRS resources. This means that the SRI's pattern (the constructure of the PRS resource set) can be configurable (depending also on the communication service to be multiplexed with sensing), e.g., either from a set of pre-defined patterns, or the configuration can be through a bitmap to indicate which symbols within the SRI should be used for sensing.

It is noted that current design and configurations of DL PRS signal, allows for realization of different patterns for mapping the signal to the resources/symbols (which is consistent/same across all SRIs). However, defining and configuring patterns rather than the time domains settings for each PRS resource within the set, enables higher configuration and signaling efficiency.

In another example, the configuration of DL PRS (e.g., configuration of DL PRS resource set) includes indication of the number of DL PRS resources and indication of the selected pattern.

Figure 4:
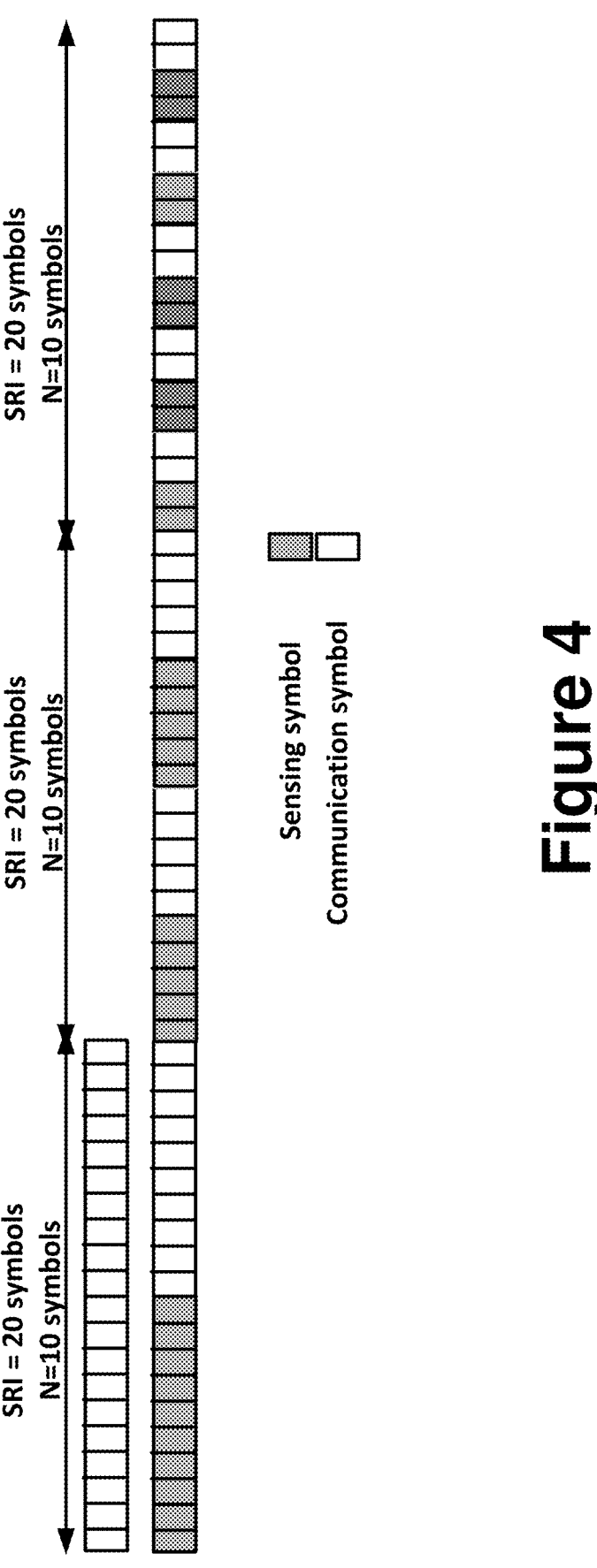
FIG. 4 illustrates an example of non-uniform SRI structure in terms of sensing and communication symbols, in accordance with various embodiments.

In an extended example, assuming that N OFDM symbols within SRI are occupied for sensing signal transmission, the pattern of distribution for these N symbols may be different from one SRI to another SRI within a sensing frame (FIG. 4). This allows some flexibility in allocation of sensing symbols. For example, if there is a communication symbols in the desired sensing direction within the SRI, it may be possible to rely on those symbols, regardless of whether the position of that symbol/direction is the same across all SRIs or not. It is also possible to accommodate sensing symbols over the symbols where there is no communication taking place, or it may be possible to schedule communication and sensing symbols flexibly to accommodate corresponding latency needed, etc.

In an extended example, the DL PRS resource set configuration allows for indication of a pattern of PRS resources within the set (e.g., from a predefined set, or via bitmap, etc.) for each occurrence of the set within the repetition window. This means that different repetitions of the set can have different patterns of resources, which enables more flexibility for the non-PRS resources within the slots, to meet the communication needs. It is noted that the current configuration of DL PRS does not support different signal to symbol mappings (i.e., different mapping of DL PRS resources) within the SRI/set across the repetitions.

Using a bit map for each occurrence of the resource set within the repetition window of the resource set, may require considerations in terms of the tradeoffs between the configuration/control signaling and the achieved flexibility for multiplexing the communication and sensing/positioning signals.

For example, across different SRIs, depending on the communication service requirements, packet sizes, etc., it may be beneficial to allow different patterns, e.g., over some SRIs, to allow more frequent communication transmission opportunities, similar to the example case in the bottom of FIG. 3. On the other hand, it is important to maintain the Nyquist sampling rate (defined by the SRI duration as the maximum time spacing allowed to sample a given direction) to avoid causing ambiguities in Doppler processing for each beam direction. For one-direction sensing, where all the N sensing symbols within the SRI are used for transmission of sensing signal in one direction and obtain repetition/processing gain, the Nyquist requirement is ensured through the SRI duration (i.e., distance between the first sensing symbols in one SRI and the last sensing symbol in the consecutive SRI, is at most qual to the SRI duration), and non-uniform distribution of the symbols across SRIs, can only cause oversampling compared to the Nyquist rate. For multi-direction sensing, where different sensing symbols within SRI are used for transmission of sensing signal in different beam directions, careful consideration is needed to ensure that for each direction, the corresponding symbols in two consecutive SRIs, are not larger than the SRI duration. In the case of multiple samples per SRI (e.g., using all sensing symbols for sensing signal transmission in one direction), some additional matrix processing, e.g., including non-uniform sample DFT (for the Doppler estimation) may be required to take care of the different phase changes across different symbol position within SRI and different frequencies.

When the OFDM symbols use for transmission of a given beam are non-uniformly distributed between different SRI intervals, at the sensing receive processing, non-uniform sampled DFT needed to be applied instead of conventional DFT to get the doppler bins. More precisely, let the symbol times for OS for beam i be denoted by $\{t_i(0), t_i(1), \ldots, t_i(K-1)\}$ where K is the slow (Doppler) DFT length. Assume delay bin l values after range processing for beam i are $\{S_i(l, 0), S_i(l, 1), \ldots, S_i(l, K-1)\}$. If we define the Doppler grid of $$\left\{\left\{0, \frac{f_d}{K}, \ldots, f_d - \frac{f_d}{K}\right\}\right\}$$

where $f_d$, is the maximum doppler intended for beam i, then the doppler processing to obtain the periodogram, $P_i$, for beam i with non-standard DFT is given by, $$P_i(l, k) = \sum_{k=0}^{K-1} S_i(l, k) e^{2j\pi \frac{kf_d t_i(k)}{K}}$$

For non-uniform sampling of $t_i$ vector, this cannot be simplified to FFT based implementation. Hence, one may need to consider the additional complexity this leads to.

Figure 5:
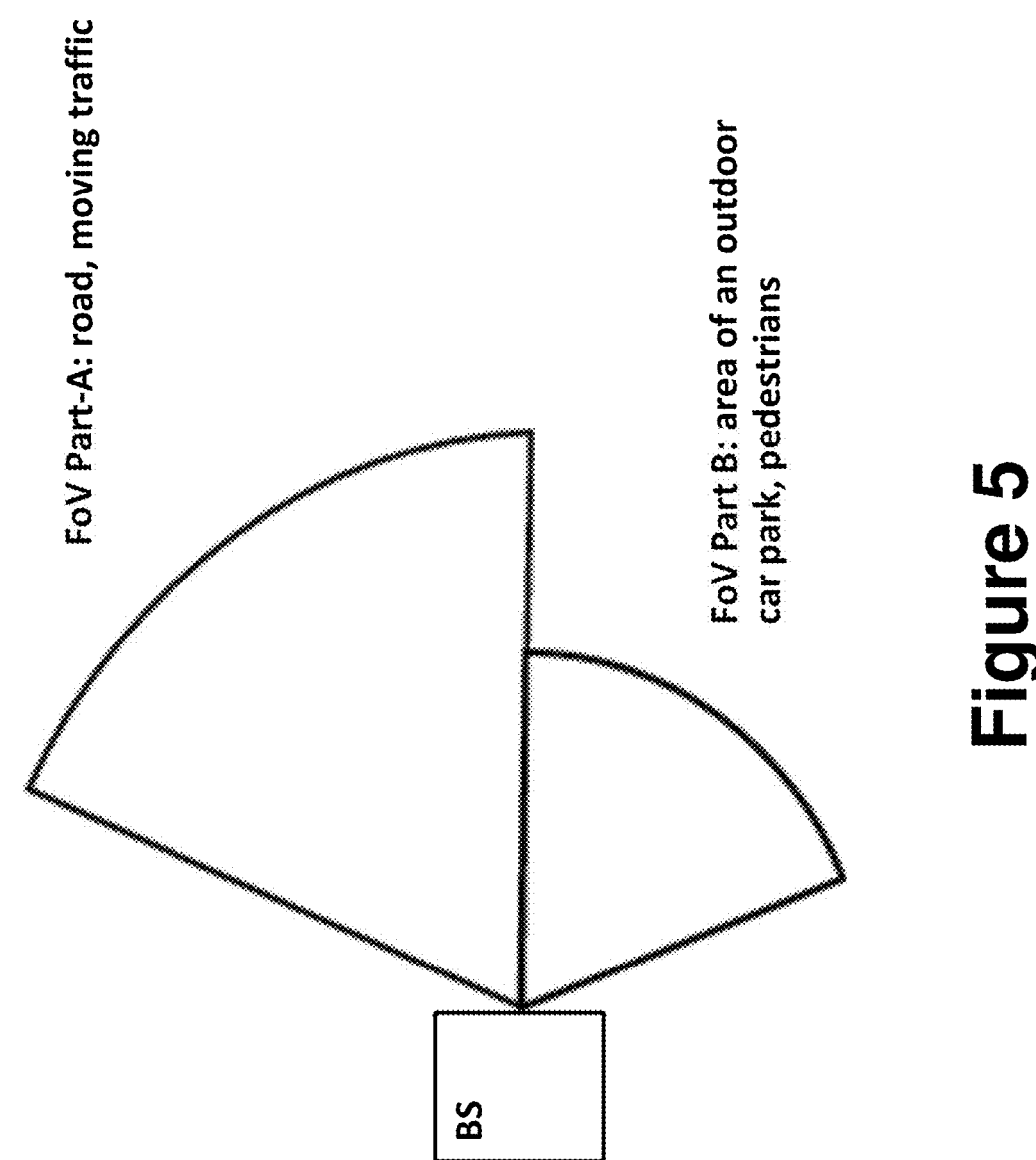
FIG. 5 illustrates an example of non-uniform field of view (FoV) in terms of speed (e.g., SRI duration) and/or range requirements, in accordance with various embodiments.

Different beams could also have different SRI durations depending on the UC. For example, one could consider an SRI of N OS for part of FoV (Part-A) and an SRI of 2*N OS for another part (Part-B), because Part B has lower max doppler requirement (FIG. 5). This concept will be also exemplified in more details, in Section 8.

It is then possible for SRIs across the sensing block, to have potentially different pattern and/or different number of sensing symbols. Still, for the multi-direction sensing, it should be ensured that each beam direction is scanned at the desired Nyquist rate, while some of the sensing symbols may also be used to achieve repetition gain. Allowing such structure for SRI, comes with extra processing at the receiver side to enable Doppler processing.

Extending DL PRS configuration to allow configurations of repetition pattern (repetition factor and repetition gap) at the granularity of PRS resource (e.g., per PRS resource) may be used, as against defining them only at the slot level. This helps with realizing different SRI durations (hence, different maximum supported unambiguously detectable speeds) for different beam directions in the FoV. Otherwise, different sets are needed to cover the FoV, e.g., each set covering the directions (DL PRS resources) with the same required SRI, which may lead to excessive configuration signaling.

In one example, the number of symbols per DL-PRS Resource within a slot, can be different for different DL PRS Resources in a DL-PRS Resource Set. For example, a parameter, e.g., dl-PRS-NumSymbols can be defined as part of the parameters describing the DL-PRS resource, rather than the DL PRS resource set. This flexibility helps with adjusting the resource requirements based on the needed detection performance on different beams.

In one example, instead of all DL PRS resources sets within a DL PRS positioning frequency layer having the same value of dl-PRS-ResourceBandwidth, the resource bandwidth can be configured per DL PRS resource set, or per DL PRS resource. For example, a parameter, e.g., dl-PRS-ResourceBandwidth is included in the parameters describing the DL PRS resource or resource set.

In one example, instead of all DL PRS resource sets belonging to the same DL PRS positioning frequency layer having the same value of dl-PRS-CombSizeN, the resource comb size can be configured per DL PRS resource set, or per DL PRS resource. For example, a parameter, e.g., dl-PRS-CombSizeN is included in the parameters describing the DL PRS resource or resource set. This flexibility can help with adjusting the resource requirements based on the needed detection performance on different beams.

Smart TX Beam Mapping to OFDM Symbols

Figure 6:
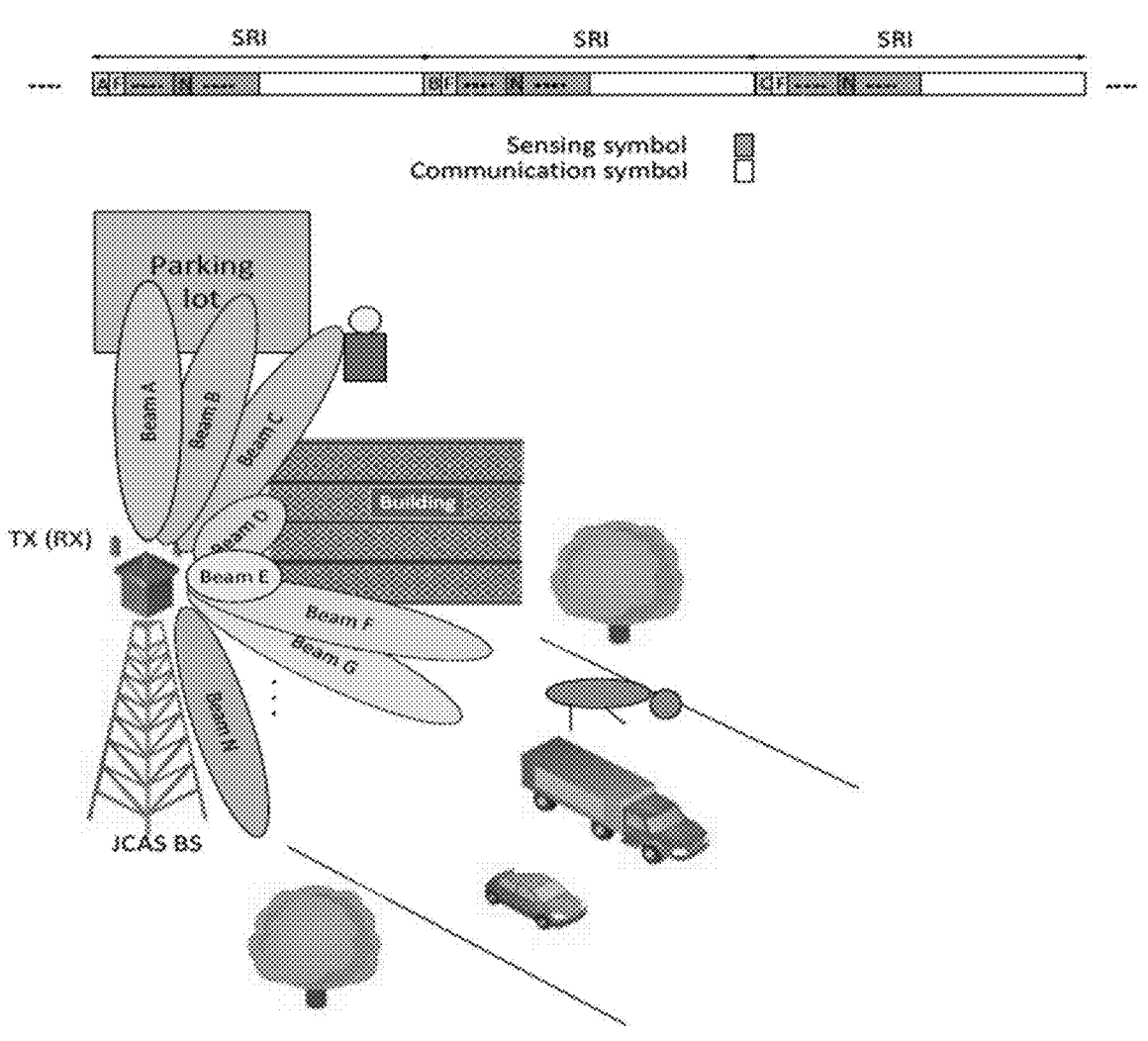
FIG. 6 illustrates an example of a sensing environment, FoV coverage, and/or mapping of transmit (Tx) beams to SRI symbols, in accordance with various embodiments.
Figure 7:
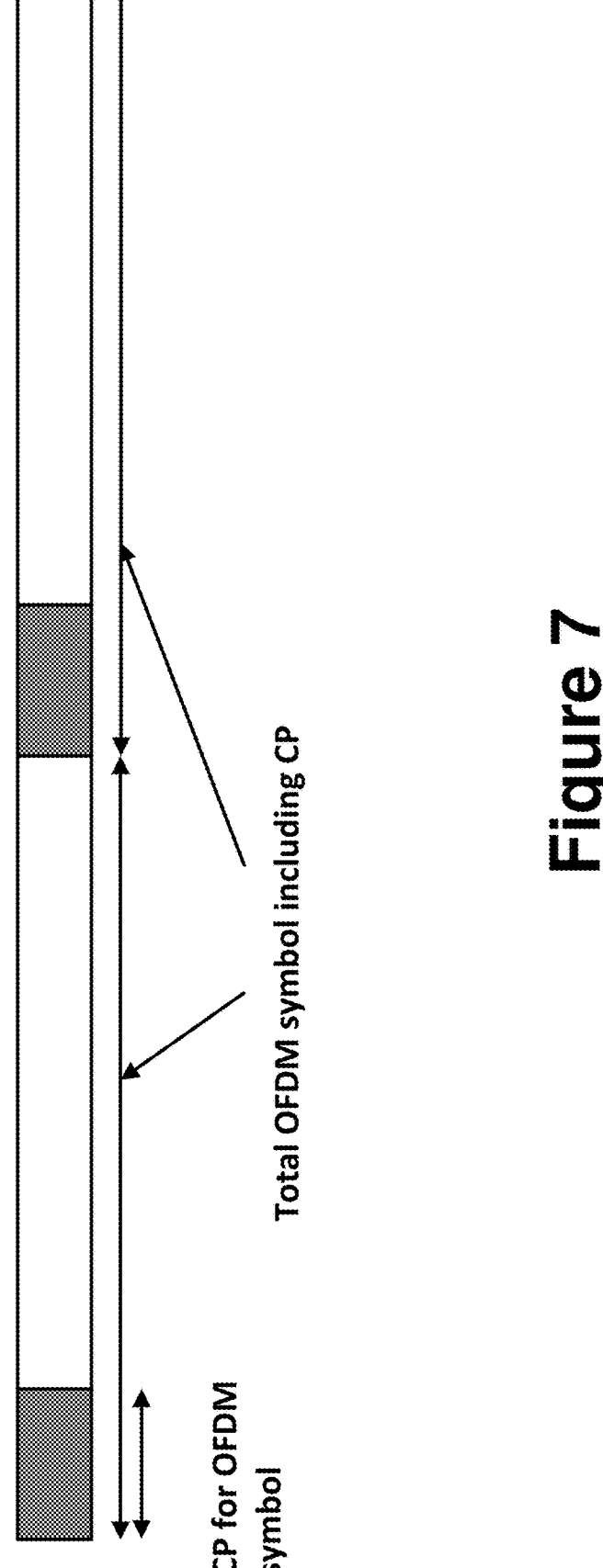
FIG. 7 illustrates an example of a structure of orthogonal frequency division multiplexed (OFDM) symbols, in accordance with various embodiments.

On top of the flexibility disclosed above, regarding the SRI structure in terms of allocating sensing/positioning and communication symbols, which allows to use each of the N sensing symbols for transmission of sensing signal in a different beam direction to cover the field of view, it is also possible to accommodate smarter mapping of the beams to SRI symbols with some potential prior information regarding the field of view and the environment to be sensed. For example, if the sensing transmit-beams are partially blocked with a large building, etc. (FIG. 6), there may be no point in scanning the environment (at least beyond the range at which the blockage is located, e.g., using beams E and D in the figure for short-range scanning), in those directions. However, over the other directions, sensing can be performed to sense the environment (up to the maximum desired detection range, e.g., beams F-N in the figure). Further, if over parts of the region included in desired field of view, objects with lower Doppler are expected, e.g., part of the FoV falls within a car park, or a pedestrian area, less frequent scanning over the corresponding directions is required, e.g., beams A-C in the figure (as the SRI duration for lower speed detection is longer). As such, it may be also possible to skip transmission in such directions, periodically, over some of the SRIs within the sensing frame. Over such unused OFDM symbols, either communication signal may be transmitted, or the symbols may be used to achieve repetition gain for other sensing symbols (the latter may be seen as oversampling in those directions). It may be also possible to use these symbols to transmit the sensing signal in other directions, which also need less frequent monitoring (e.g., beams A, B, C, has lower occurrence than beams F-N, since A-C, are directed at a parking lot. For example, beams A-C, only appear in every third SRI). Accordingly, in order to cover this part of the field of view, twice in the angle range can be covered, using the same amount of resources within the SRI, whereas beams F-N which are covering the road area with larger Dopplers, have to be repeated in every SRI. As also mentioned earlier, the resources within the SRI provide a tradeoff between the maximum dateable speed, the FoV coverage, the processing gain, and flexibility for TDM with communication.

Smart TX Beamforming and Time-Mapping in TDM to Relax CP Requirement for Sensing As discussed earlier, the sensing ISI-free range detection requirement can be translated into the CP duration requirement. For ideal ISI-free range detection performance, CP duration (TCP) should be on the order of 2*(maximum range)/c0. NR CP in FR1, is long enough to cover ranges beyond 180-350 m. As such, FR1 supports longer range UCs, with same CP and OFDM symbol durations for communication and sensing symbols. Also, in FR1, useful symbol duration is very large compared to the orders of CPs desired for sensing ranging (low CP loss). It is noted that in general, between the sensing numerology and the communication numerology, only CP (hence, total symbol duration) may need to be different. For FR2, supporting a unified symbol/CP duration between communication and sensing may not be possible for higher SCSs, depending on UC's max range requirement. Particularly, with current numerologies and frame structure, FR2 can support shorter to medium range UCs, with same CP and OFDM symbol duration for sensing and communication, and longer-range UCs, with different CP and OFDM symbol duration for sensing and communication. In case of using different CP (which may be mainly motivated if there is a need to support longer sensing ranges (>100 m) with higher SCSs in FR2), proper alignment between sensing block durations and communication slot boundaries is required, as discussed earlier. Further, for higher SCSs (i.e., lower useful symbol durations), maintaining a certain CP duration to accommodate the ISI-free range detection, translates into higher CP loss. In this section, approaches that can be adopted by vendor implementations for more efficient handling and suppression of ISI via intelligent beam shaping, are discussed, which can impact the choice of CP length for the OFDM symbols. Unless otherwise stated, in this section, the focus is on analog beamforming at the transmitter. At the receiver side, in order to enable high angular resolution algorithms (e.g., ESPIRIT, MUSIC, etc.), it is still possible to assume that each RX antenna will have a wide beam that covers entire FoV. Alternatively, the receiver may support MIMO digital beamforming. At the same time, it is also noted that with analog beamforming at the receiver, it may be possible to relax the CP requirement for ISI-free detection to some extent, in case of transmitting in different beam directions over consecutive OFDM symbols, with proper mapping of beams to OFDM symbols. Still, even in such cases, the proposed approaches in this section can provide a more organized way, to ensure that the beams are created in a way that the two adjacent beams in time are not next to each other. Particularly, regardless of whether the receiver implements digital, analog, or no beamforming, a proper mapping/sweeping order can be defined to reduce the inter symbol interference and the required CP length. While the CP loss issue becomes more critical for higher SCSs, the proposed approach can be equally applicable to FR1, and FR2 with lower or higher SCSs, and help with reducing the CP duration (and CP loss).

Further, it is noted that this approach is applicable to block-level TDM of sensing and communication, as well as the intra-block-level (intra-SRI-level) TDM cases where there is a block of consecutive [contiguous] sensing symbols within the SRI. As such, when considering longer CP duration for the first sensing symbol (to handle inter-symbol interference from prior communication symbols, over which the sensing beamforming may not have control over), it refers to the first sensing symbol within the set of consecutive sensing symbols within SRI.

Embodiment 3: OFDM Numerology

Figure 8:
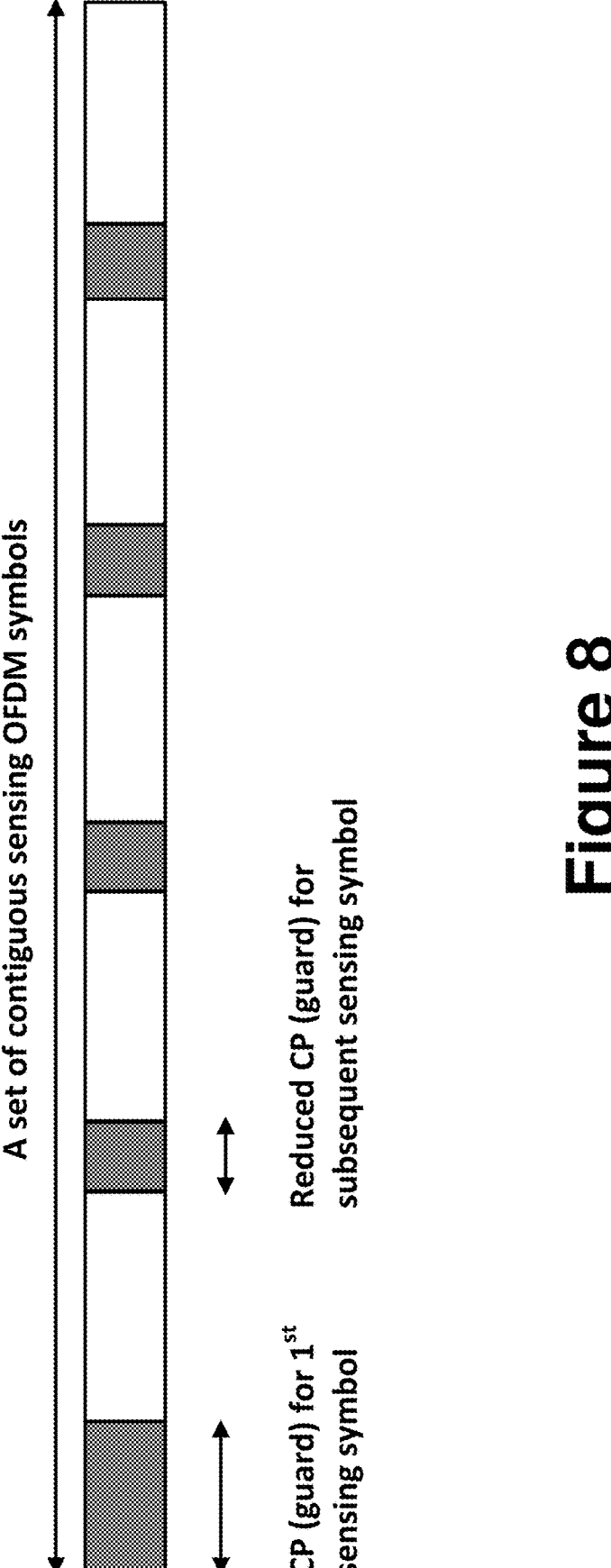
FIG. 8 illustrates an example structure of a block of contiguous sensing symbols, in accordance with various embodiments.

The CP overhead issue can be addressed as follows: when there is a contiguous set of sensing symbols within the SRI, beamforming for the sensing can be controlled by the sensing transmission (e.g., at the base station for network-based sensing). On the other hand, it is noted that if the sensing symbol is adjacent to a communication symbol, then the sensing entity may not have control over the beamforming for the communication symbols, since that depends on the radio signal's receiver' (e.g., user's) location/direction as well as other factors usually controlled by the scheduler. But in the case of sensing symbols placed one next to each other, the sensing entity can decide how to scan the field of view, e.g., to have the first beam pointing left, the second beam pointing right (not pointing the same direction), etc. Such scheme can be used to minimize the inter-symbol interference between the sensing symbols, in the spatial domain. As such, in cases where there is a contiguous block of sensing symbols, the present approach provides a potential way to reduce the CP overhead. It is also noted that with this approach, the uniformity across the SRIs within a sensing block can be maintained, as the focus is on the mapping the beams to the sensing symbols within SRI. According to the proposed approach, the first OFDM in a block of contiguous sensing symbols has full CP needed to avoid ISI (e.g., from prior communication OFDM symbol, over which, the sensing beamforming may not have control over), while the sub-sequent symbols can have shorter CP (FIG. 8), by using spatial separation (between sensing beams) to avoid ISI (further details will be provided in the next subsections). For the cases where the communication CP and OFDM symbol duration are also adequate for the sensing purposes, the CP (guard interval) similar to that of communication can be selected for the first sensing symbol in the block of contiguous sensing symbols, while the subsequent sensing symbols can have smaller CP. Within the set of contiguous sensing symbols, adjacent OFDM symbols are then beamformed to be separated by half FoV (or any other way) to avoid interference between the beams.

In a previous embodiment, it was disclosed that for SCS>=120 KHz, every m NCP slots, e.g., m can be chosen to align with a subframe or frame boundary or some other time unit, are matched to every n (newly defined) extended CP symbols (where both NCP and ECP can be different (larger) for the first symbols within m and n symbols, respectively). This defines a subframe of extended CP (with the first symbol having extra extended CP duration), which is boundary aligned with a subframe of normal CP. The DL PRS resources and the DL PRS resource set(s) can then be configured over this ECP OFDM symbols within this subframe duration.

The techniques discussed in the current section show that if a set of consecutive symbols are to be used for transmission of radio signal for sensing (e.g., to be used for transmission of DL PRS signal, etc.), from the processing point of view, it is also feasible to consider a larger CP for the first symbol used for sensing (i.e., as large as the CP required for the prior communication symbol), while other subsequent sensing symbols can have shorter CP duration compared to the first symbol. For the specification to allow such signal transmission, in one embodiment, the DL PRS configuration supports configuring special DL PRS resource sets, which occupy back-to-back DL PRS resources/symbols over one or multiple slots (may not necessarily occupy integer number of slots) and the symbols within the special sets (except the first symbol), can have a configurable or predefined CP duration smaller than the CP duration of the first symbol which can also be a part of the PRS configuration. The indication of the special set can be part of the PRS resource set or frequency layer configuration (explicit or implicit). In one example, the selection of the first symbol's CP duration and the CP duration of the rest of the symbols within the set can be realized via the NR design of one symbol each 0.5 ms having longer CP than other symbols For NCP slots, if these CP values meet the sensing needs.

In one example, the configuration also allows for back-to-back repetitions of the special set, such that over the entire span of the set repetitions, all symbols are used for the purpose of positioning/sensing (no communication symbol in between). The special set configuration then allows for the larger CP only be configured for the first symbol of the first copy/instance of the set.

For example, consider a DL PRS resource set with SCS=60 KHz which occupies one slot over its first instance, with 14 DL PRS resources each of 1-OFDM symbol duration being configured back-to-back (even though NR may not currently support such configuration, but future systems can allow such configuration). As mentioned earlier, currently, for SCS=60 KHz, the NR slot and radio frame/subframe design is such that the normal CP duration for the 0th and 28th OFDM symbols is 1.69 us, while for the other OFDM symbols, it is 1.17 us, and there are 14 OFDM symbols within each slot. On the other hand, the extended CP is 4.17 us, and there are 12 OFDM symbols within the slot of extended CP. Given that the useful OFDM symbol duration is 16.67 us for SCS=60 KHz, two slots of normal CP symbols occupies 17.84*27+(16.67+1.69)=500.04 us, while two slots of extended CP symbols occupies 24*(16.67+4.17)=500.16 us. As such, adopting a different CP duration for different symbols within a specific time interval (e.g., the 1st symbol having a different CP compared to the rest), has precedence in the current specification (not for sensing-related reasons). Particularly, with normal CP (NCP), the CP of the first symbol present every 0.5 ms is longer than that of other symbols. Such design helps aligning the subframe boundaries across different numerologies. In an example of the above embodiment, assuming a repetition gap of zero slot and a repetition factor of M, the configuration of DL PRS allows for configuring CP duration of T_cp_NR+x for the first symbol in the total of M*14 OFDM symbols (T_cp_NR denotes the CP duration in NR numerology), and CP duration of T_cp_NR−y for the other M*14−1 symbols such that x and y satisfy the following equation:

$$(T\_OFDM\_symbol\_NR-y)*(M*14-1)=32*500.04 \text{ us}-(T\_OFDM\_symbol\_NR+x) \text{ us}.$$

Alternatively, DL PRS allows for configuring CP duration of T_cp_NR+x for the first symbol in every slot across the M slots, and CP duration of T_cp_NR−y for the other symbols such that x and y satisfy the following equation:

$$(T\_OFDM\_symbol\_NR-y)*M*(14-1)=32*500.04 \text{ us}-M*(T\_OFDM\_symbol\_NR+x) \text{ us}.$$

For example, assuming SCS=60 KHz, and M=64 to meet the requirements of the use-case, the configuration of DL PRS allows for configuring CP duration of 1.17+x for the first symbol in the total of M*14 OFDM symbols, and CP duration of 1.17−y for the other M*14−1 symbols such that (16.67+1.17−y)*(M*14−1)=32*500.04 us−(16.67+1.17+x) us. Alternatively, DL PRS allows for configuring CP duration of 1.17+x for the first symbol in every slot across the M slots, and CP duration of 1.17−y for the other symbols such that x and y satisfy the following equation:

$$(16.67+1.17-y)*M*(14-1)=32*500.04 \text{ us}-M*(16.67+1.17+x) \text{ us}.$$

Hardware and Beamforming Architecture

Figure 9:
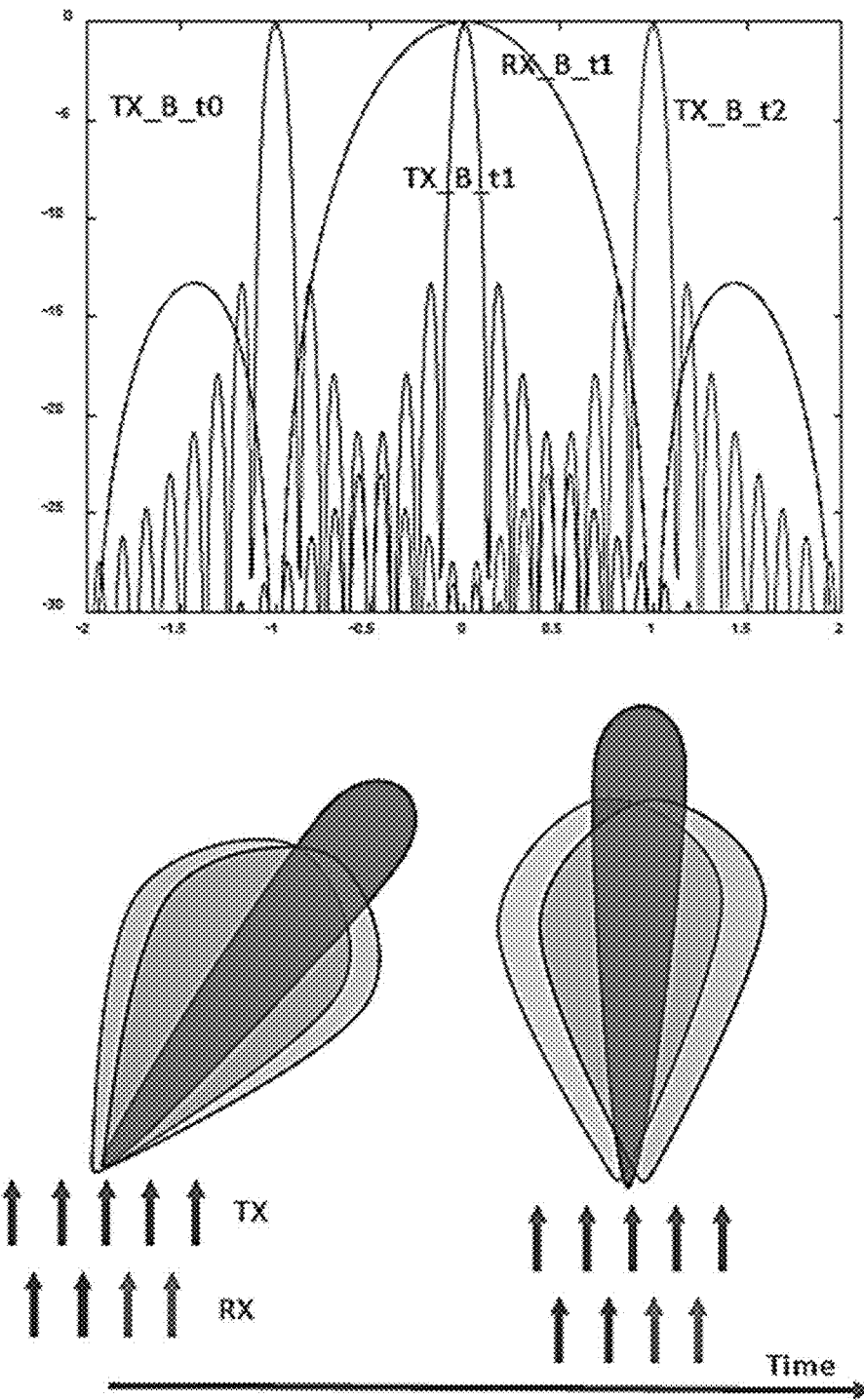
FIG. 9 illustrates an example of Tx and receive (Rs) beamforming for sensing, in accordance with various embodiments.

For sensing symbol transmission, beamforming in TX is considered (with potentially narrow transmit beams), while at the receiver side, a wide beam, e.g., half FoV beamforming in RX is considered. The wider receive beam allows for combining only 2 or few antennas so that we have as many MIMO channels as possible for angle resolution algorithms with spatial smoothing, etc. The nulls of the RX beam are aligned to beam direction of adjacent sensing OFDM symbol in time. FIG. 9 shows an example of 3 consecutive TX beams for times 0, 1, and 2 and RX beam for time 1. The RX beam at time 1 has nulls at TX beams for adjacent times. This can be used to mitigate inter symbol interference and therefore, reduce CP overhead for sensing.

With the above approach, it may be even possible to avoid CP transmission, in case the beams mapped to adjacent symbols do not overlap.

Mitigation of Intercarrier Interference (ICI) (Informative Text)

Figure 10:
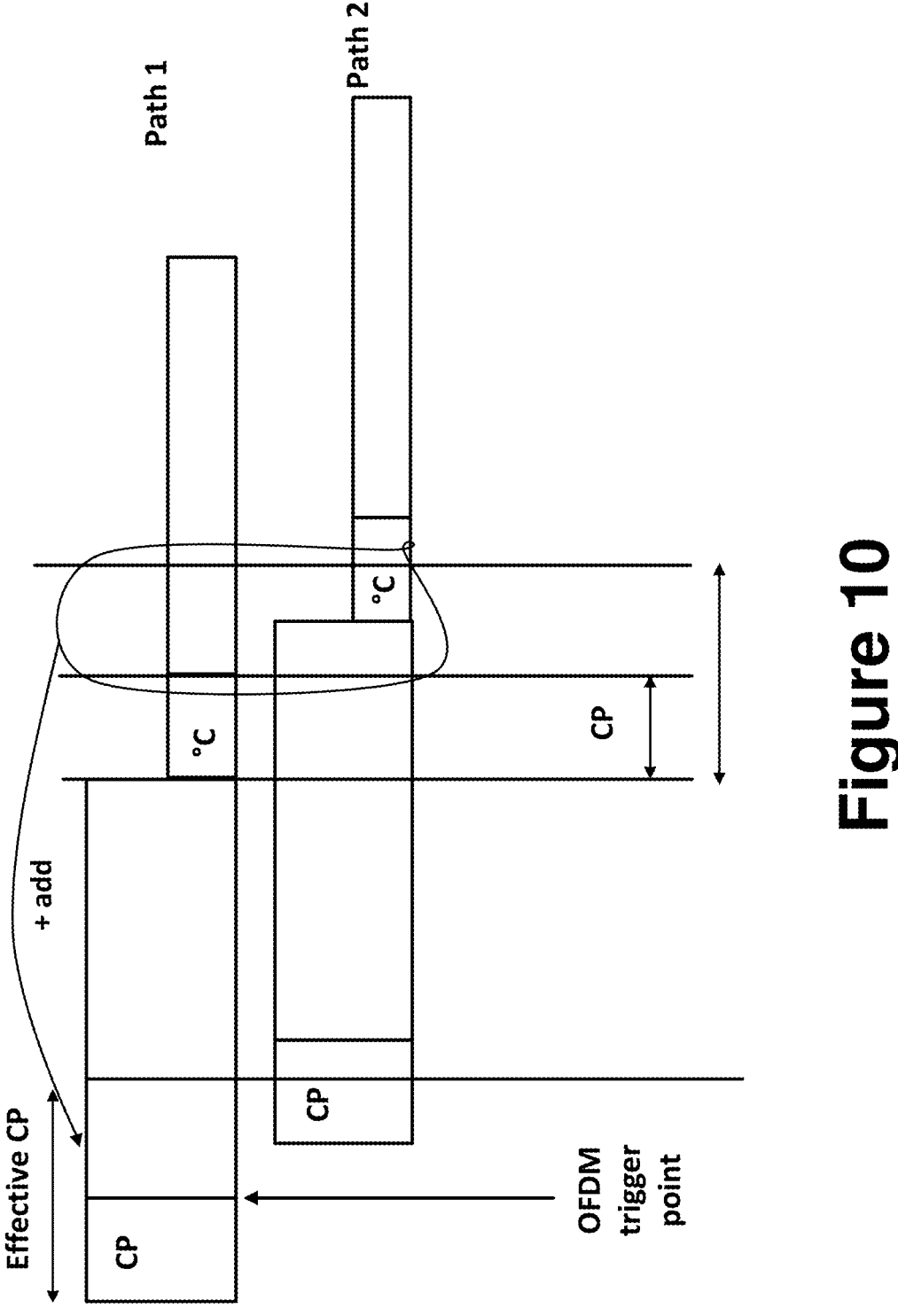
FIG. 10 illustrates an example of cyclic prefix (CP) reconstruction that may increase effective CP length, in accordance with various embodiments.

The guard interval per OFDM symbol, not only protects the signal from inter-symbol interference, but also, by proper choice of CP transmitted during the guard interval, intercarrier interference is also mitigated. With the above approach of allowing reduced CP duration, proper handling of intercarrier interference due to loss of orthogonality, is also needed. This can be achieved via some time domain processing to reconstruct the original cyclic prefix. Example of CP reconstruction for two-path signal with delay spread larger than the conventional CP is shown in FIG. 10. It is noted that the second OFDM symbol is attenuated significantly when viewed in the received beam of first OFDM symbol (symbol powers not drawn to scale).

This shows how proper receiver algorithms can be implemented to support the numerologies with relaxed CP choices as discussed above.

Impact from Receiver Beamforming in the Proposed Approach

Figure 11:
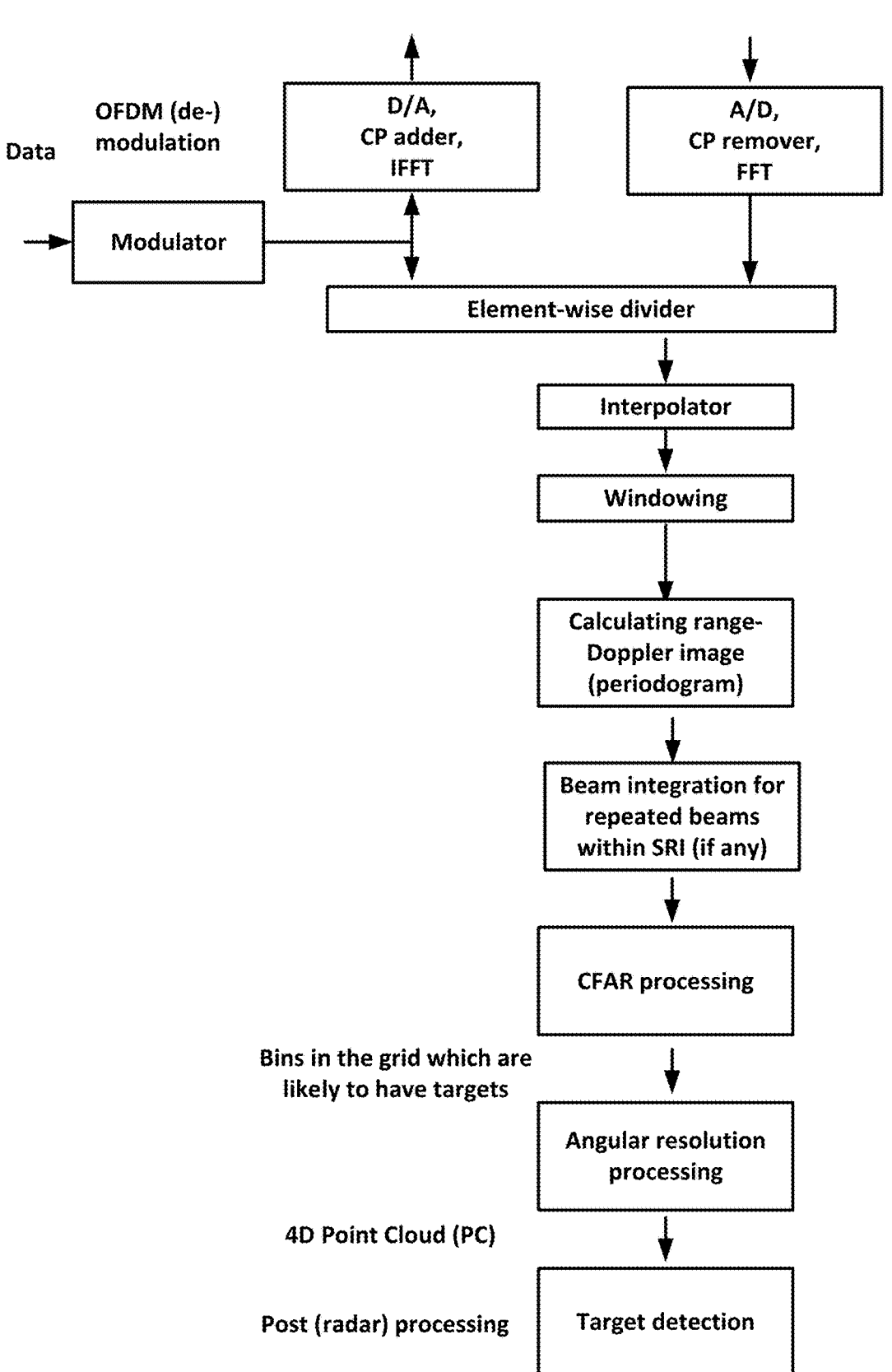
FIG. 11 illustrates an example of sensing target detection receiver processing, in accordance with various embodiments.

From the transmit side point of view, the proposed approach, can be realized at the level of the symbol generation. The receiver has to also be aware that such scheme is applied at the transmission. The rest of the processing (including the CP removal, etc.), can remain as it is shown in FIG. 11, while ideally, the beamforming can be applied before the range-Doppler calculation/processing. Particularly, the beamforming can be applied, even before the element-wise divider in FIG. 11.

Figure 12:
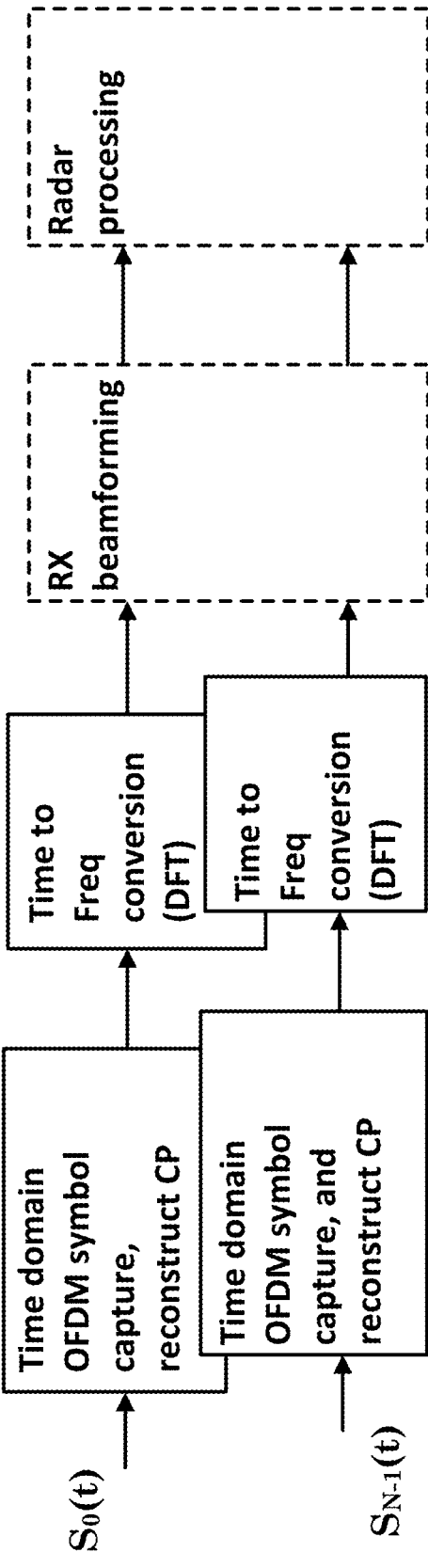
FIG. 12 illustrates an example of Rx processing, with or without beamforming, in accordance with various embodiments.

It would be beneficial to understand whether without the explicit RX beamforming (e.g., as described in previous subsections), the proposed approach can still be applicable. From the angular processing perspective, the receiver super resolution algorithms may only anal 16e the TX beamwidth. From that perspective, even if the signal energy comes from the previous and next symbol from outside the anal 16ed angle range, it may not degrade the angle detection performance. On the other hand, for RX processing prior to the angular resolution processing, i.e., for delay-doppler processing, this may cause certain inaccuracies (may impact Constant False Alarm Rate (CFAR) processing performance), which may be resolved after the angular processing. As such, the choice of receiver beamforming may not be a key enabler for the proposed approach (FIG. 12). In any case, a more robust solution may be to apply beamforming before CFAR processing for this method.

Extension to FDM

If digital BF is possible at TX, multiple TX beams can be created for different sub-carriers (or RBs) and speed up the scanning of FoV. On top of that, CP reduction (elimination) ideas described in previous sections can be applied on RB-by-RB basis.

Embodiment 4: Realizing Minimum SRI for High-Speed High Frequency Applications While the insertion of a guard interval filled with CP for OFDM waveform is an effective measure for preventing ISI, keeps the orthogonality between OFDM subcarriers unaffected by the time delays, and enables an efficient FFT-based processing at the OFDM receiver, it leads to a certain efficiency loss both in terms of power efficiency as well as effective time of measurement for a single OFDM symbol. particularly, the reduced power efficiency, is because the signal energy contained in the CP is not captured at the receiver. Also, the use of CP increases the SRI of OFDM radar, resulting in a reduction of the unambiguously measurable velocity range. While for radar the former means a certain (typically insignificant) SNR loss, the latter determines the lower limit for the symbol repetition interval (SRI) denoted by TSRI≥TOFDM, and thus the unambiguously measurable velocity range.

An operation mode dedicated to radar, called repeated symbols OFDM (RS-OFDM) may address these concerns. While for communication the OFDM symbols carry communication data, and thus the consecutive symbols are generally different, in case of radar these are simply waveforms that serve for channel sensing and thus can be fixed to one repeating OFDM symbol. This has the advantage that the CP is no longer needed, and the same waveform can be repeated periodically without breaks. Technically speaking, this leads to ISI between identical symbols, i.e., analogous to CP-OFDM for a duration T the delayed OFDM symbols are a cyclically shifted version of the transmitted symbol. Hence, the advantage of CP-OFDM in terms of orthogonality between OFDM subcarriers is obtained, yet without reduction of the power efficiency. This radar-dedicated operation mode is named RS-OFDM.

Figure 13:
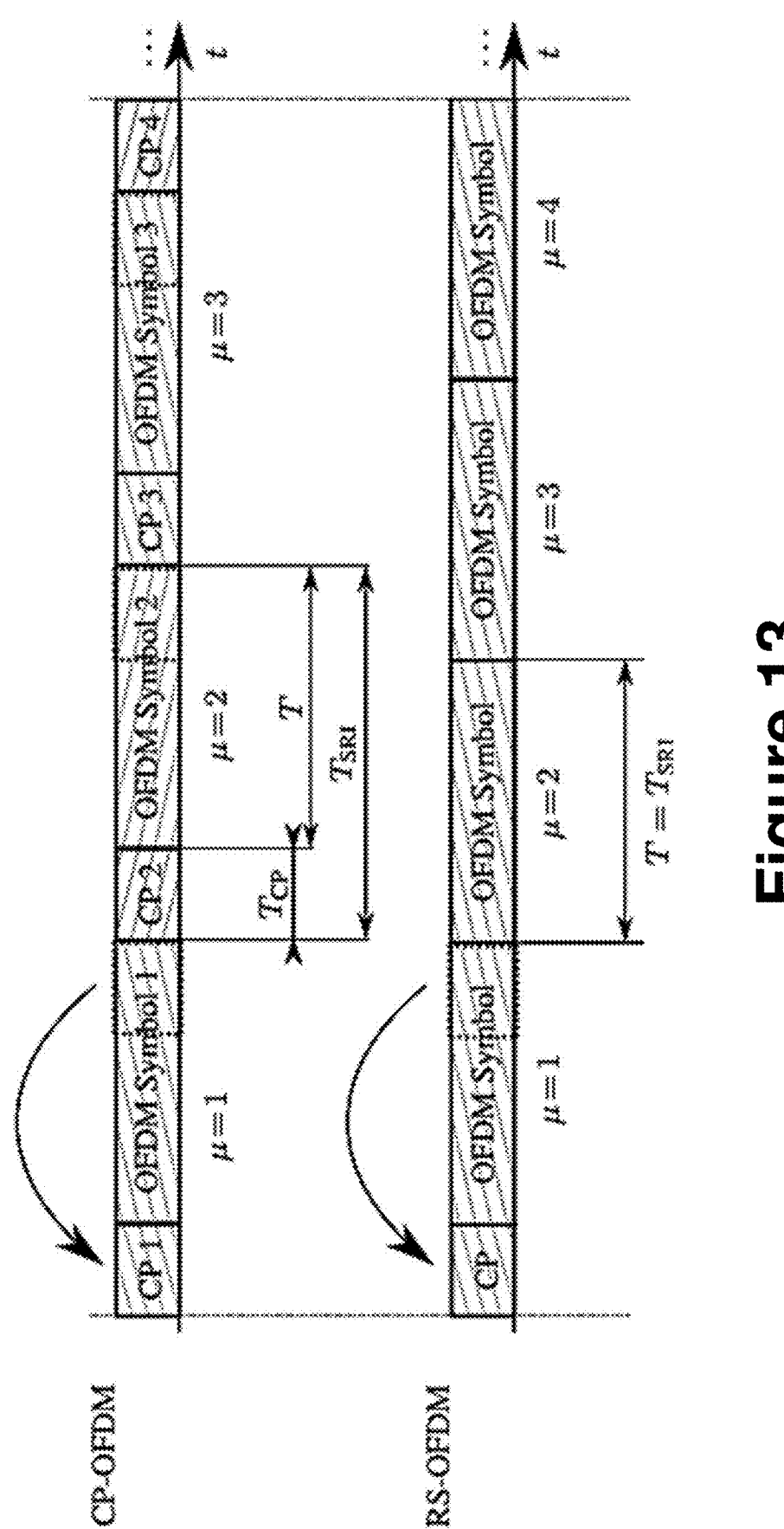
FIG. 13 illustrates an example comparison of repeated symbols OFDM (RS-OFDM) to CP-OFDM for a CP duration of T=3, in accordance with various embodiments.
Figure 14:
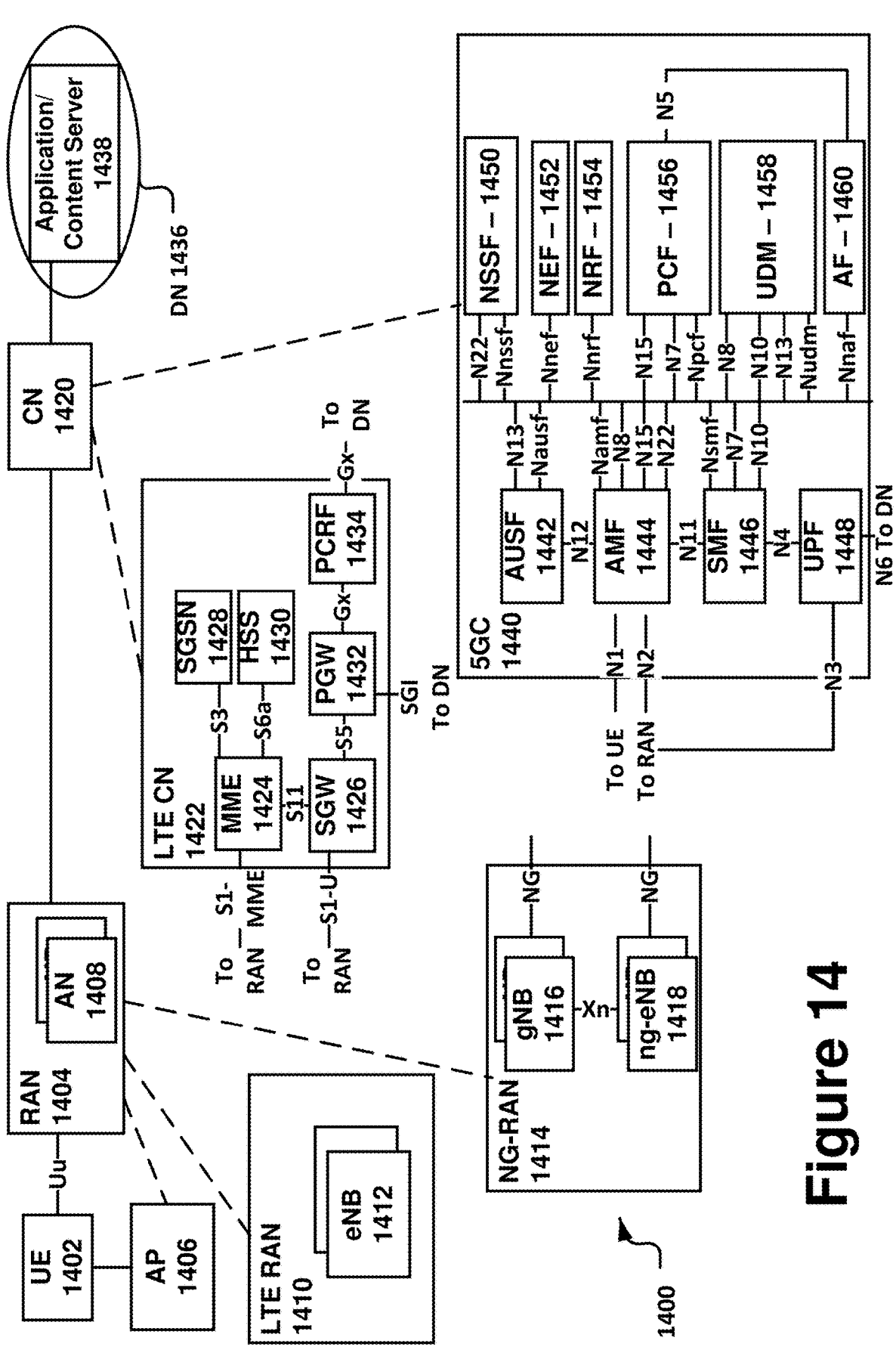
FIG. 14 schematically illustrates a wireless network in accordance with various embodiments.

The principle of RS-OFDM is illustrated in FIG. 13. Clearly, in the shown example where TCP=T=3, RS-OFDM enables transmission of four OFDM symbols at a time duration when with CP-OFDM only three symbols are transmitted. With RS-OFDM, CP needs to be used only for the first symbol, and for all subsequent symbols CP is omitted. That is, the energy efficiency is increased from T=(T+TCP) to Tcycle=(Tcycle+TCP). This improves, among others, the SNR at the receiver, since more signal energy is received. A further, even more significant advantage of RS-OFDM in the context of radar is the reduction of the SRI to TSRI=T, i.e. to its minimum. This maximizes the unambiguously measurable velocity range vu. This is a considerable advantage for high carrier frequencies (e.g., at 77 GHz), since for those frequencies the Doppler effect is stronger, and the unambiguous velocity range is accordingly lower.

Evidently, the advantage of RS-OFDM in terms of increased power efficiency and maximized unambiguous velocity range comes at the cost of fixing the consecutive OFDM symbols to a single symbol used for the entire measurement cycle. Impact of repeated symbols OFDM (RS-OFDM) on positioning/sensing signal generation Impact of Repeated Symbols OFDM (RS-OFDM) on Positioning/Sensing Signal Generation As mentioned earlier, there may be certain requirements with respect to the OFDM modulation symbols to enable RS-OFDM operation. Accordingly, certain adaptations to the positioning reference signal (DL-PRS) in the cellular system are also needed for the purpose of DL-PRS-based sensing under this operation mode.

In one embodiment, for example for the use-cases with high-speed requirements and over higher carrier frequencies, the DL-PRS configuration allows for configuring DL PRS resource set with back-to-back length-1-symbol DL PRS resources, wherein the same PRS sequence is mapped to all the PRS resources, and only the first symbol (first DL-PRS resource) within the sensing frame (i.e., the repetition window of the set, containing all the repetitions of the set) is configured with a CP, while all other symbols (DL-PRS resources and their repetitions) are configured with zero CP. For this special configuration, the repetition gap should also be zero, i.e., all the repetitions of the set are back-to-back. This allows for the SRI of duration one useful OFDM symbol duration, resulting in detection of high unambiguous measurable speed.

Systems And Implementations

FIGS. 14-17 illustrate various systems, devices, and components that may implement aspects of disclosed embodiments.

f illustrates a network 1400 in accordance with various embodiments. The network 1400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1400 may include a UE 1402, which may include any mobile or non-mobile computing device designed to communicate with a RAN 1404 via an over-the-air connection. The UE 1402 may be communicatively coupled with the RAN 1404 by a Uu interface. The UE 1402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1402 may additionally communicate with an AP 1406 via an over-the-air connection. The AP 1406 may manage a WLAN connection, which may serve to offload some/all network traffic from the RAN 1404. The connection between the UE 1402 and the AP 1406 may be consistent with any IEEE 802.11 protocol, wherein the AP 1406 could be a wireless fidelity (Wi-Fi®) router. In some embodiments, the UE 1402, RAN 1404, and AP 1406 may utilize cellular-WLAN aggregation (for example, LWA/LWIP). Cellular-WLAN aggregation may involve the UE 1402 being configured by the RAN 1404 to utilize both cellular radio resources and WLAN resources.

The RAN 1404 may include one or more access nodes, for example, AN 1408. AN 1408 may terminate air-interface protocols for the UE 1402 by providing access stratum protocols including RRC, PDCP, RLC, MAC, and L1 protocols. In this manner, the AN 1408 may enable data/voice connectivity between CN 1420 and the UE 1402. In some embodiments, the AN 1408 may be implemented in a discrete device or as one or more software entities running on server computers as part of, for example, a virtual network, which may be referred to as a CRAN or virtual baseband unit pool. The AN 1408 be referred to as a BS, gNB, RAN node, eNB, ng-eNB, NodeB, RSU, TRxP, TRP, etc. The AN 1408 may be a macrocell base station or a low power base station for providing femtocells, picocells or other like cells having smaller coverage areas, smaller user capacity, or higher bandwidth compared to macrocells.

In embodiments in which the RAN 1404 includes a plurality of ANs, they may be coupled with one another via an X2 interface (if the RAN 1404 is an LTE RAN) or an Xn interface (if the RAN 1404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1404 may each manage one or more cells, cell groups, component carriers, etc. to provide the UE 1402 with an air interface for network access. The UE 1402 may be simultaneously connected with a plurality of cells provided by the same or different ANs of the RAN 1404. For example, the UE 1402 and RAN 1404 may use carrier aggregation to allow the UE 1402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1402 or AN 1408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1404 may be an LTE RAN 1410 with eNB s, for example, eNB 1412. The LTE RAN 1410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1404 may be an NG-RAN 1414 with gNBs, for example, gNB 1416, or ng-eNBs, for example, ng-eNB 1418. The gNB 1416 may connect with UEs using a 5G NR interface. The gNB 1416 may connect with a 5G core through an NG interface, which may include an N2 interface or an N3 interface. The ng-eNB 1418 may also connect with the 5G core through an NG interface, but may connect with a UE via an LTE air interface. The gNB 1416 and the ng-eNB 1418 may connect with each other over an Xn interface.

In some embodiments, the NG interface may be split into two parts, an NG user plane (NG-U) interface, which carries traffic data between the nodes of the NG-RAN 1414 and a UPF 1448 (e.g., N3 interface), and an NG control plane (NG-C) interface, which is a signaling interface between the nodes of the NG-RAN 1414 and an AMF 1444 (e.g., N2 interface).

The NG-RAN 1414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1402 can be configured with multiple BWPs where each BWP configuration has a different SCS. When a BWP change is indicated to the UE 1402, the SCS of the transmission is changed as well. Another use case example of BWP is related to power saving. In particular, multiple BWPs can be configured for the UE 1402 with different amount of frequency resources (for example, PRBs) to support data transmission under different traffic loading scenarios. A BWP containing a smaller number of PRBs can be used for data transmission with small traffic load while allowing power saving at the UE 1402 and in some cases at the gNB 1416. A BWP containing a larger number of PRBs can be used for scenarios with higher traffic load.

The RAN 1404 is communicatively coupled to CN 1420 that includes network elements to provide various functions to support data and telecommunications services to customers/subscribers (for example, users of UE 1402). The components of the CN 1420 may be implemented in one physical node or separate physical nodes. In some embodiments, NFV may be utilized to virtualize any or all of the functions provided by the network elements of the CN 1420 onto physical compute/storage resources in servers, switches, etc. A logical instantiation of the CN 1420 may be referred to as a network slice, and a logical instantiation of a portion of the CN 1420 may be referred to as a network sub-slice.

In some embodiments, the CN 1420 may be an LTE CN 1422, which may also be referred to as an EPC. The LTE CN 1422 may include MME 1424, SGW 1426, SGSN 1428, HSS 1430, PGW 1432, and PCRF 1434 coupled with one another over interfaces (or "reference points") as shown. Functions of the elements of the LTE CN 1422 may be briefly introduced as follows.

The MME 1424 may implement mobility management functions to track a current location of the UE 1402 to facilitate paging, bearer activation/deactivation, handovers, gateway selection, authentication, etc.

The SGW 1426 may terminate an S1 interface toward the RAN and route data packets between the RAN and the LTE CN 1422. The SGW 1426 may be a local mobility anchor point for inter-RAN node handovers and also may provide an anchor for inter-3GPP mobility. Other responsibilities may include lawful intercept, charging, and some policy enforcement.

The SGSN 1428 may track a location of the UE 1402 and perform security functions and access control. In addition, the SGSN 1428 may perform inter-EPC node signaling for mobility between different RAT networks; PDN and S-GW selection as specified by MME 1424; MME selection for handovers; etc. The S3 reference point between the MME 1424 and the SGSN 1428 may enable user and bearer information exchange for inter-3GPP access network mobility in idle/active states.

The HSS 1430 may include a database for network users, including subscription-related information to support the network entities' handling of communication sessions. The HSS 1430 can provide support for routing/roaming, authentication, authorization, naming/addressing resolution, location dependencies, etc. An S6a reference point between the HSS 1430 and the MME 1424 may enable transfer of subscription and authentication data for authenticating/authorizing user access to the LTE CN 1420.

The PGW 1432 may terminate an SGi interface toward a data network (DN) 1436 that may include an application/content server 1438. The PGW 1432 may route data packets between the LTE CN 1422 and the data network 1436. The PGW 1432 may be coupled with the SGW 1426 by an S5 reference point to facilitate user plane tunneling and tunnel management. The PGW 1432 may further include a node for policy enforcement and charging data collection (for example, PCEF). Additionally, the SGi reference point between the PGW 1432 and the data network 14 36 may be an operator external public, a private PDN, or an intra-operator packet data network, for example, for provision of IMS services. The PGW 1432 may be coupled with a PCRF 1434 via a Gx reference point.

The PCRF 1434 is the policy and charging control element of the LTE CN 1422. The PCRF 1434 may be communicatively coupled to the app/content server 1438 to determine appropriate QoS and charging parameters for service flows. The PCRF 1432 may provision associated rules into a PCEF (via Gx reference point) with appropriate TFT and QCI.

In some embodiments, the CN 1420 may be a 5GC 1440. The 5GC 1440 may include an AUSF 1442, AMF 1444, SMF 1446, UPF 1448, NSSF 1450, NEF 1452, NRF 1454, PCF 1456, UDM 1458, and AF 1460 coupled with one another over interfaces (or "reference points") as shown. Functions of the elements of the 5GC 1440 may be briefly introduced as follows.

The AUSF 1442 may store data for authentication of UE 1402 and handle authentication-related functionality. The AUSF 1442 may facilitate a common authentication framework for various access types. In addition to communicating with other elements of the 5GC 1440 over reference points as shown, the AUSF 1442 may exhibit an Nausf service-based interface.

The AMF 1444 may allow other functions of the 5GC 1440 to communicate with the UE 1402 and the RAN 1404 and to subscribe to notifications about mobility events with respect to the UE 1402. The AMF 1444 may be responsible for registration management (for example, for registering UE 1402), connection management, reachability management, mobility management, lawful interception of AMF-related events, and access authentication and authorization. The AMF 1444 may provide transport for SM messages between the UE 1402 and the SMF 1446, and act as a transparent proxy for routing SM messages. AMF 1444 may also provide transport for SMS messages between UE 1402 and an SMSF. AMF 1444 may interact with the AUSF 1442 and the UE 1402 to perform various security anchor and context management functions. Furthermore, AMF 1444 may be a termination point of a RAN CP interface, which may include or be an N2 reference point between the RAN 1404 and the AMF 1444; and the AMF 1444 may be a termination point of NAS (N1) signaling, and perform NAS ciphering and integrity protection. AMF 1444 may also support NAS signaling with the UE 1402 over an N3 IWF interface.

The SMF 1446 may be responsible for SM (for example, session establishment, tunnel management between UPF 1448 and AN 1408); UE IP address allocation and management (including optional authorization); selection and control of UP function; configuring traffic steering at UPF 1448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1444 over N2 to AN 1408; and determining SSC mode of a session. SM may refer to management of a PDU session, and a PDU session or "session" may refer to a PDU connectivity service that provides or enables the exchange of PDUs between the UE 1402 and the data network 1436.

The UPF 1448 may act as an anchor point for intra-RAT and inter-RAT mobility, an external PDU session point of interconnect to data network 1436, and a branching point to support multi-homed PDU session. The UPF 1448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1448 may include an uplink classifier to support routing traffic flows to a data network.

The NSSF 1450 may select a set of network slice instances serving the UE 1402. The NSSF 1450 may also determine allowed NSSAI and the mapping to the subscribed S-NSSAIs, if needed. The NSSF 1450 may also determine the AMF set to be used to serve the UE 1402, or a list of candidate AMFs based on a suitable configuration and possibly by querying the NRF 1454. The selection of a set of network slice instances for the UE 1402 may be triggered by the AMF 1444 with which the UE 1402 is registered by interacting with the NSSF 1450, which may lead to a change of AMF. The NSSF 1450 may interact with the AMF 1444 via an N22 reference point; and may communicate with another NSSF in a visited network via an N31 reference point (not shown). Additionally, the NSSF 1450 may exhibit an Nnssf service-based interface.

The NEF 1452 may securely expose services and capabilities provided by 3GPP network functions for third party, internal exposure/re-exposure, AFs (e.g., AF 1460), edge computing or fog computing systems, etc. In such embodiments, the NEF 1452 may authenticate, authorize, or throttle the AFs. NEF 1452 may also translate information exchanged with the AF 1460 and information exchanged with internal network functions. For example, the NEF 1452 may translate between an AF-Service-Identifier and an internal 5GC information. NEF 1452 may also receive information from other NFs based on exposed capabilities of other NFs. This information may be stored at the NEF 1452 as structured data, or at a data storage NF using standardized interfaces. The stored information can then be re-exposed by the NEF 1452 to other NFs and AFs, or used for other purposes such as analytics. Additionally, the NEF 1452 may exhibit an Nnef service-based interface.

The NRF 1454 may support service discovery functions, receive NF discovery requests from NF instances, and provide the information of the discovered NF instances to the NF instances. NRF 1454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1454 may exhibit the Nnrf service-based interface.

The PCF 1456 may provide policy rules to control plane functions to enforce them, and may also support unified policy framework to govern network behavior. The PCF 1456 may also implement a front end to access subscription information relevant for policy decisions in a UDR of the UDM 1458. In addition to communicating with functions over reference points as shown, the PCF 1456 exhibit an Npcf service-based interface.

The UDM 1458 may handle subscription-related information to support the network entities' handling of communication sessions, and may store subscription data of UE 1402. For example, subscription data may be communicated via an N8 reference point between the UDM 1458 and the AMF 1444. The UDM 1458 may include two parts, an application front end and a UDR. The UDR may store subscription data and policy data for the UDM 1458 and the PCF 1456, and/or structured data for exposure and application data (including PFDs for application detection, application request information for multiple UEs 1402) for the NEF 1452. The Nudr service-based interface may be exhibited by the UDR 221 to allow the UDM 1458, PCF 1456, and NEF 1452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1458 may exhibit the Nudm service-based interface.

The AF 1460 may provide application influence on traffic routing, provide access to NEF, and interact with the policy framework for policy control.

In some embodiments, the 5GC 1440 may enable edge computing by selecting operator/3rd party services to be geographically close to a point that the UE 1402 is attached to the network. This may reduce latency and load on the network. To provide edge-computing implementations, the 5GC 1440 may select a UPF 1448 close to the UE 1402 and execute traffic steering from the UPF 1448 to data network 1436 via the N6 interface. This may be based on the UE subscription data, UE location, and information provided by the AF 1460. In this way, the AF 1460 may influence UPF (re)selection and traffic routing. Based on operator deployment, when AF 1460 is considered to be a trusted entity, the network operator may permit AF 1460 to interact directly with relevant NFs. Additionally, the AF 1460 may exhibit an Naf service-based interface.

The data network 1436 may represent various network operator services, Internet access, or third party services that may be provided by one or more servers including, for example, application/content server 1438.

Figure 15:
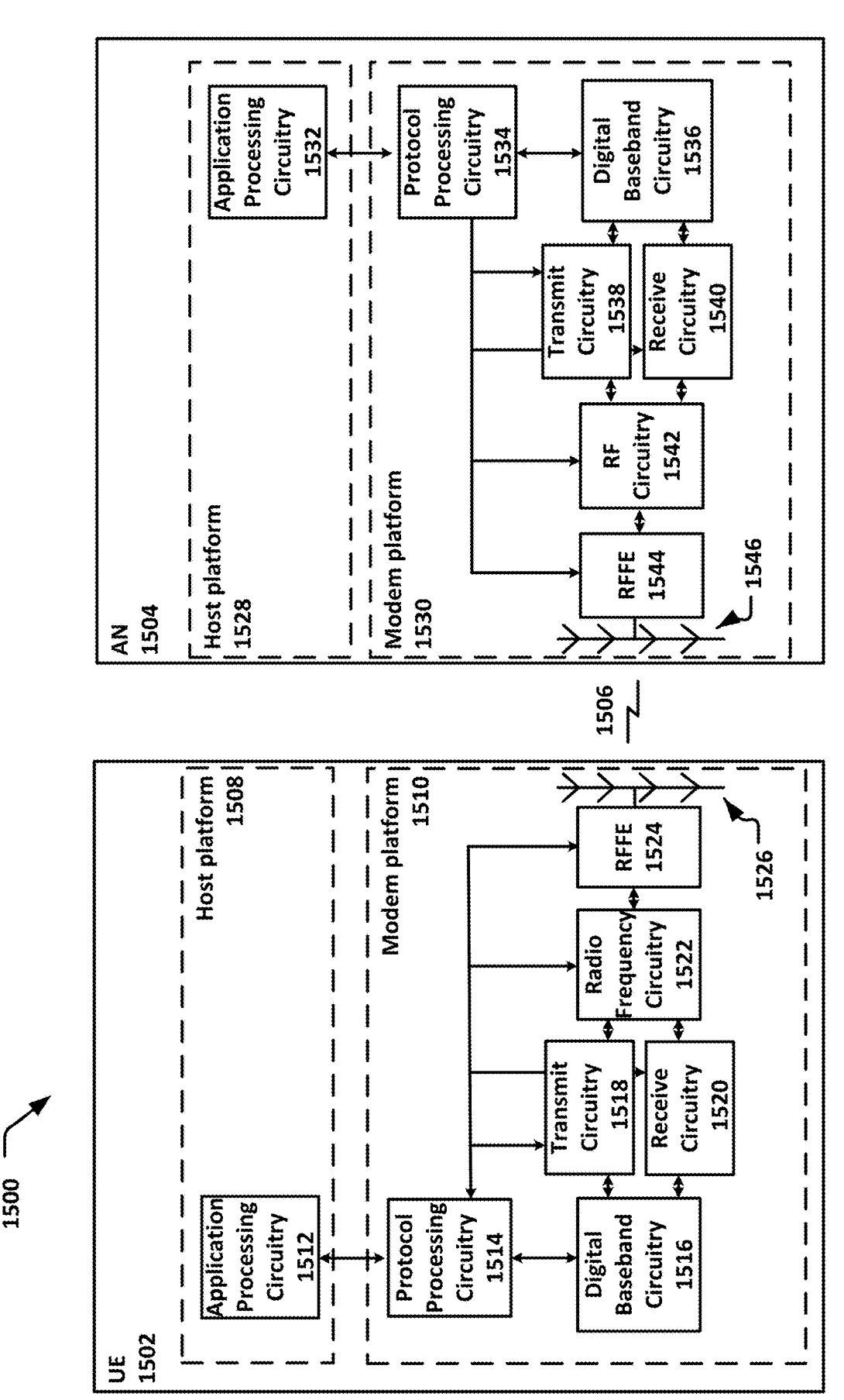
FIG. 15 schematically illustrates components of a wireless network in accordance with various embodiments.

FIG. 15 schematically illustrates a wireless network 1500 in accordance with various embodiments. The wireless network 1500 may include a UE 1502 in wireless communication with an AN 1504. The UE 1502 and AN 1504 may be similar to, and substantially interchangeable with, like-named components described elsewhere herein.

The UE 1502 may be communicatively coupled with the AN 1504 via connection 1506. The connection 1506 is illustrated as an air interface to enable communicative coupling, and can be consistent with cellular communications protocols such as an LTE protocol or a 5G NR protocol operating at mmWave or sub-6 GHz frequencies.

The UE 1502 may include a host platform 1508 coupled with a modem platform 1510. The host platform 1508 may include application processing circuitry 1512, which may be coupled with protocol processing circuitry 1514 of the modem platform 1510. The application processing circuitry 1512 may run various applications for the UE 1502 that source/sink application data. The application processing circuitry 1512 may further implement one or more layer operations to transmit/receive application data to/from a data network. These layer operations may include transport (for example UDP) and Internet (for example, IP) operations The protocol processing circuitry 1514 may implement one or more of layer operations to facilitate transmission or reception of data over the connection 1506. The layer operations implemented by the protocol processing circuitry 1514 may include, for example, MAC, RLC, PDCP, RRC and NAS operations.

The modem platform 1510 may further include digital baseband circuitry 1516 that may implement one or more layer operations that are "below" layer operations performed by the protocol processing circuitry 1514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1510 may further include transmit circuitry 1518, receive circuitry 1520, RF circuitry 1522, and RF front end (RFFE) 1524, which may include or connect to one or more antenna panels 1526. Briefly, the transmit circuitry 1518 may include a digital-to-analog converter, mixer, intermediate frequency (IF) components, etc.; the receive circuitry 1520 may include an analog-to-digital converter, mixer, IF components, etc.; the RF circuitry 1522 may include a low-noise amplifier, a power amplifier, power tracking components, etc.; RFFE 1524 may include filters (for example, surface/bulk acoustic wave filters), switches, antenna tuners, beamforming components (for example, phase-array antenna components), etc. The selection and arrangement of the components of the transmit circuitry 1518, receive circuitry 1520, RF circuitry 1522, RFFE 1524, and antenna panels 1526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1514 may include one or more instances of control circuitry (not shown) to provide control functions for the transmit/receive components.

A UE reception may be established by and via the antenna panels 1526, RFFE 1524, RF circuitry 1522, receive circuitry 1520, digital baseband circuitry 1516, and protocol processing circuitry 1514. In some embodiments, the antenna panels 1526 may receive a transmission from the AN 1504 by receive-beamforming signals received by a plurality of antennas/antenna elements of the one or more antenna panels 1526.

A UE transmission may be established by and via the protocol processing circuitry 1514, digital baseband circuitry 1516, transmit circuitry 1518, RF circuitry 1522, RFFE 1524, and antenna panels 1526. In some embodiments, the transmit components of the UE 1504 may apply a spatial filter to the data to be transmitted to form a transmit beam emitted by the antenna elements of the antenna panels 1526.

Similar to the UE 1502, the AN 1504 may include a host platform 1528 coupled with a modem platform 1530. The host platform 1528 may include application processing circuitry 1532 coupled with protocol processing circuitry 1534 of the modem platform 1530. The modem platform may further include digital baseband circuitry 1536, transmit circuitry 1538, receive circuitry 1540, RF circuitry 1542, RFFE circuitry 1544, and antenna panels 1546. The components of the AN 1504 may be similar to and substantially interchangeable with like-named components of the UE 1502. In addition to performing data transmission/reception as described above, the components of the AN 1508 may perform various logical functions that include, for example, RNC functions such as radio bearer management, uplink and downlink dynamic radio resource management, and data packet scheduling.

Figure 16:
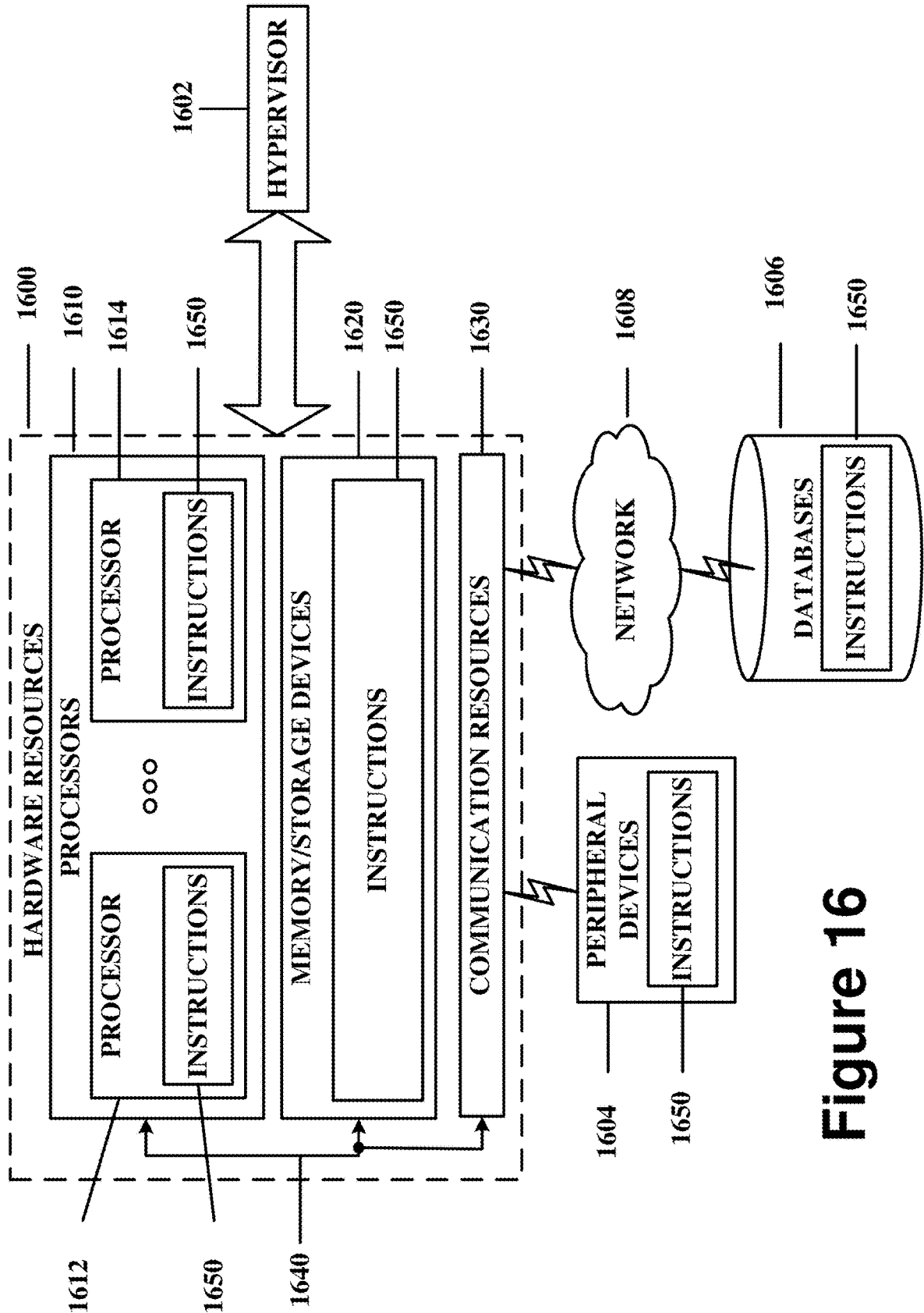
FIG. 16 is a block diagram illustrating components, according to some example embodiments, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640 or other interface circuitry. For embodiments where node virtualization (e.g., NFV) is utilized, a hypervisor 1602 may be executed to provide an execution environment for one or more network slices/sub-slices to utilize the hardware resources 1600.

The processors 1610 may include, for example, a processor 1612 and a processor 1614. The processors 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1630 may include interconnection or network interface controllers, components, or other suitable devices to communicate with one or more peripheral devices 1604 or one or more databases 1606 or other network elements via a network 1608. For example, the communication resources 1630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Figure 17:
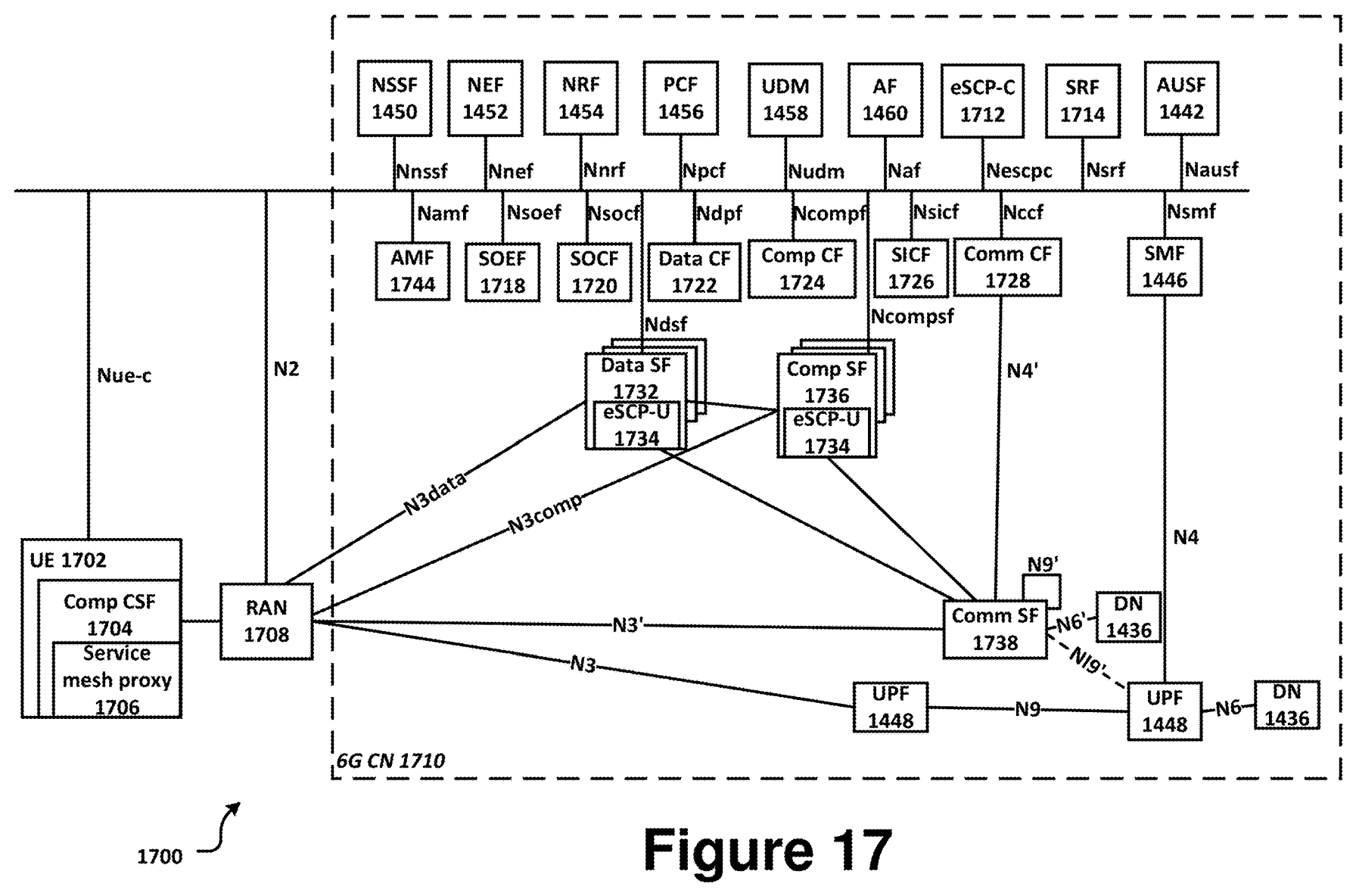

FIG. 17 illustrates a network 1700 in accordance with various embodiments. The network 1700 may operate in a matter consistent with 3GPP technical specifications or technical reports for 6G systems. In some embodiments, the network 1700 may operate concurrently with network 1400. For example, in some embodiments, the network 1700 may share one or more frequency or bandwidth resources with network 1400. As one specific example, a UE (e.g., UE 1702) may be configured to operate in both network 1700 and network 1400. Such configuration may be based on a UE including circuitry configured for communication with frequency and bandwidth resources of both networks 1400 and 1700. In general, several elements of network 1700 may share one or more characteristics with elements of network 1400. For the sake of brevity and clarity, such elements may not be repeated in the description of network 1700.

The network 1700 may include a UE 1702, which may include any mobile or non-mobile computing device designed to communicate with a RAN 1708 via an over-the-air connection. The UE 1702 may be similar to, for example, UE 1402. The UE 1702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 17, in some embodiments the network 1700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 17, the UE 1702 may be communicatively coupled with an AP such as AP 1406 as described with respect to FIG. 14. Additionally, although not specifically shown in FIG. 17, in some embodiments the RAN 1708 may include one or more ANss such as AN 1408 as described with respect to FIG. 14. The RAN 1708 and/or the AN of the RAN 1708 may be referred to as a base station (BS), a RAN node, or using some other term or name.

The UE 1702 and the RAN 1708 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 1708 may allow for communication between the UE 1702 and a 6G core network (CN) 1710. Specifically, the RAN 1708 may facilitate the transmission and reception of data between the UE 1702 and the 6G CN 1710. The 6G CN 1710 may include various functions such as NSSF 1450, NEF 1452, NRF 1454, PCF 1456, UDM 1458, AF 1460, SMF 1446, and AUSF 1442. The 6G CN 1710 may additional include UPF 1448 and DN 1436 as shown in FIG. 17.

Additionally, the RAN 1708 may include various additional functions that are in addition to, or alternative to, functions of a legacy cellular network such as a 4G or 5G network. Two such functions may include a Compute Control Function (Comp CF) 1724 and a Compute Service Function (Comp SF) 1736. The Comp CF 1724 and the Comp SF 1736 may be parts or functions of the Computing Service Plane. Comp CF 1724 may be a control plane function that provides functionalities such as management of the Comp SF 1736, computing task context generation and management (e.g., create, read, modify, delete), interaction with the underlaying computing infrastructure for computing resource management, etc. Comp SF 1736 may be a user plane function that serves as the gateway to interface computing service users (such as UE 1702) and computing nodes behind a Comp SF instance. Some functionalities of the Comp SF 1736 may include: parse computing service data received from users to compute tasks executable by computing nodes; hold service mesh ingress gateway or service API gateway; service and charging policies enforcement; performance monitoring and telemetry collection, etc. In some embodiments, a Comp SF 1736 instance may serve as the user plane gateway for a cluster of computing nodes. A Comp CF 1724 instance may control one or more Comp SF 1736 instances.

Two other such functions may include a Communication Control Function (Comm CF) 1728 and a Communication Service Function (Comm SF) 1738, which may be parts of the Communication Service Plane. The Comm CF 1728 may be the control plane function for managing the Comm SF 1738, communication sessions creation/configuration/releasing, and managing communication session context. The Comm SF 1738 may be a user plane function for data transport. Comm CF 1728 and Comm SF 1738 may be considered as upgrades of SMF 1446 and UPF 1448, which were described with respect to a 5G system in FIG. 14. The upgrades provided by the Comm CF 1728 and the Comm SF 1738 may enable service-aware transport. For legacy (e.g., 4G or 5G) data transport, SMF 1446 and UPF 1448 may still be used.

Two other such functions may include a Data Control Function (Data CF) 1722 and Data Service Function (Data SF) 1732 may be parts of the Data Service Plane. Data CF 1722 may be a control plane function and provides functionalities such as Data SF 1732 management, Data service creation/configuration/releasing, Data service context management, etc. Data SF 1732 may be a user plane function and serve as the gateway between data service users (such as UE 1702 and the various functions of the 6G CN 1710) and data service endpoints behind the gateway. Specific functionalities may include: parse data service user data and forward to corresponding data service endpoints, generate charging data, report data service status.

Another such function may be the Service Orchestration and Chaining Function (SOCF) 1720, which may discover, orchestrate and chain up communication/computing/data services provided by functions in the network. Upon receiving service requests from users, SOCF 1720 may interact with one or more of Comp CF 1724, Comm CF 1728, and Data CF 1722 to identify Comp SF 1736, Comm SF 1738, and Data SF 1732 instances, configure service resources, and generate the service chain, which could contain multiple Comp SF 1736, Comm SF 1738, and Data SF 1732 instances and their associated computing endpoints. Workload processing and data movement may then be conducted within the generated service chain. The SOCF 1720 may also responsible for maintaining, updating, and releasing a created service chain.

Another such function may be the service registration function (SRF) 1714, which may act as a registry for system services provided in the user plane such as services provided by service endpoints behind Comp SF 1736 and Data SF 1732 gateways and services provided by the UE 1702. The SRF 1714 may be considered a counterpart of NRF 1454, which may act as the registry for network functions.

Other such functions may include an evolved service communication proxy (eSCP) and service infrastructure control function (SICF) 1726, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 1712 and eSCP-U 1734, for control plane service communication proxy and user plane service communication proxy, respectively. The SICF 1726 may control and configure eCSP instances in terms of service traffic routing policies, access rules, load balancing configurations, performance monitoring, etc.

Another such function is the AMF 1744. The AMF 1744 may be similar to 1444, but with additional functionality. Specifically, the AMF 1744 may include potential functional repartition, such as move the message forwarding functionality from the AMF 1744 to the RAN 1708.

Another such function is the service orchestration exposure function (SOEF) 1718. The SOEF may be configured to expose service orchestration and chaining services to external users such as applications.

The UE 1702 may include an additional function that is referred to as a computing client service function (comp CSF) 1704. The comp CSF 1704 may have both the control plane functionalities and user plane functionalities, and may interact with corresponding network side functions such as SOCF 1720, Comp CF 1724, Comp SF 1736, Data CF 1722, and/or Data SF 1732 for service discovery, request/response, compute task workload exchange, etc. The Comp CSF 1704 may also work with network side functions to decide on whether a computing task should be run on the UE 1702, the RAN 1708, and/or an element of the 6G CN 1710.

The UE 1702 and/or the Comp CSF 1704 may include a service mesh proxy 1706. The service mesh proxy 1706 may act as a proxy for service-to-service communication in the user plane. Capabilities of the service mesh proxy 1706 may include one or more of addressing, security, load balancing, etc.

Example Procedures

In some embodiments, the electronic device(s), network(s), system(s), chip(s) or component(s), or portions or implementations thereof, of FIGS. 14-17, or some other figure herein, may be configured to perform one or more processes, techniques, or methods as described herein, or portions thereof.

Figure 18:
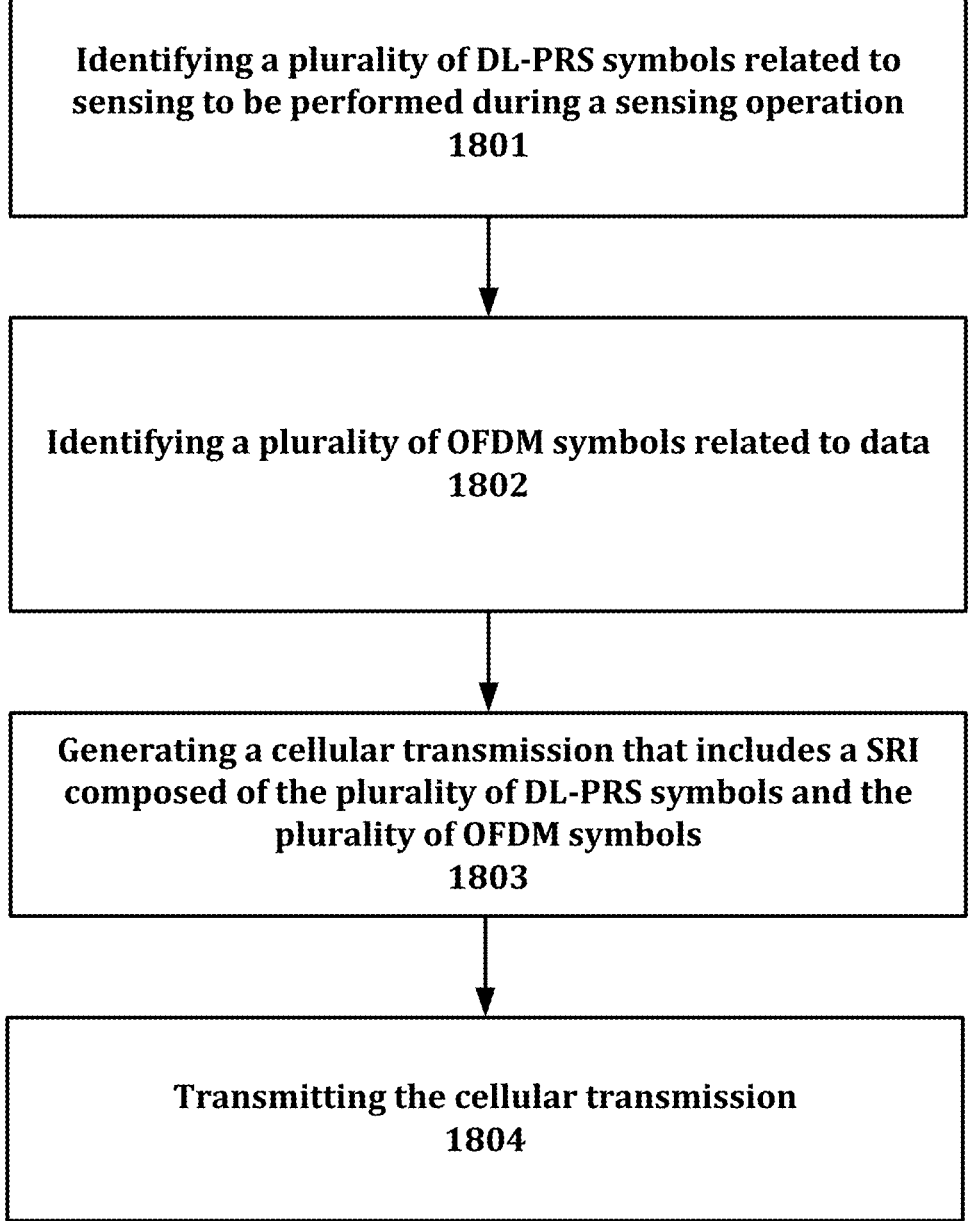
FIG. 18 depicts an example procedure for practicing the various embodiments discussed herein.

One such process is depicted in FIG. 18. The process of FIG. 18 may be performed by a user equipment (UE), a base station, and/or some other element of a cellular network. The process may include identifying, at 1801, a plurality of downlink positioning reference signal (DL-PRS) symbols related to sensing to be performed during a sensing operation; identifying, at 1802, a plurality of orthogonal frequency division multiplexed (OFDM) symbols related to data; generating, at 1803, a cellular transmission that includes a symbol repetition interval (SRI) composed of the plurality of DL-PRS symbols and the plurality of OFDM symbols; and transmitting, at 1804, the cellular transmission.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include an apparatus used in a sensing and communication system wherein the apparatus comprises
  a processor circuitry configured to cause a sensing entity
    to map the sensing modulated symbols to time and frequency resources of an Orthogonal Frequency Division Multiplexing (OFDM) resource grid such that the total time span over which recurring OFDM symbols are occupied by the sensing modulated symbols (called sensing frame), is a multiple integer (K) of the periodicity with which such sensing modulated symbols are mapped to OFDM symbols (called $T_{SRI}$ where SRI stands for Symbol Repetition Interval), and
  transmit the sensing modulated symbols,
  and a processor circuitry configured to cause a communication entity to
  map the communication modulated symbols to time and frequency resources of the same OFDM resource grid such that a plurality of OFDM symbols within SRI are used to carry communication signal (intra-block-level (intra-SRI-level) TDM), and
  transmit the communication modulated symbols.

Example 2 may include an apparatus used in a sensing and communication system wherein the apparatus comprises
  a processor circuitry configured to cause a sensing entity
    to map the sensing modulated symbols to time and frequency resources of an Orthogonal Frequency Division Multiplexing (OFDM) resource grid such that the total time span over which recurring OFDM symbols are occupied by the sensing modulated symbols (called sensing frame), is a multiple integer (K) of the periodicity with which such sensing modulated symbols are mapped to OFDM symbols (called $T_{SRI}$ where SRI stands for Symbol Repetition Interval), and
  transmit the sensing modulated symbols,
  and a processor circuitry configured to cause a communication entity to
  map the communication modulated symbols to time and frequency resources of the same OFDM resource grid such that none of OFDM symbols within SRI are used to carry communication signal (inter-block-level TDM), and all OFDM symbols for mapping the communication modulated symbols are located outside of total sensing frame duration of $K \times T_{SRI}$ OFDM symbols, and
  transmit the communication modulated symbols.

Example 3 may include the apparatus of example 1 or some other example herein, wherein same configurable number $N \geq 1$ OFDM symbols in (each and every) SRI within sensing frame is dedicated for sensing, with the same pattern for distribution of the sensing symbols within (each and every) SRI.

Example 4 may include the apparatus of examples 1 and 3 or some other example herein, wherein a fixed pattern of N symbols across SRIs in the sensing block is supported, and the selection of the pattern can be based on a set of configurable patterns.

Example 5 may include the apparatus of example 1 or some other example herein, wherein assuming that N OFDM symbols within SRI are occupied for sensing signal transmission, the pattern of distribution for these N symbols may be different from one SRI to another SRI within a sensing frame.

Example 6 may include the apparatus of example 5 or some other example herein, wherein when the OFDM symbol for a given beam is non-uniformly distributed between different SRI intervals, at the sensing receive processing, non-uniform sampled DFT is applied instead of conventional DFT to get the doppler bins.

Example 7 may include the apparatus of example 5 or some other example herein, wherein if there is a communication symbols in the desired sensing direction within the SRI, it is possible to rely on those symbols for sensing as well, regardless of whether the position of that symbol/direction is the same across all SRIs or not.

Example 8 may include the apparatus of example 5 or some other example herein, wherein the selection of N symbols within each SRI is based on the communication service requirements, packet sizes, and latency/reliability requirements.

Example 9 may include the apparatus of example 1 or some other example herein, wherein different beams covering different parts of field of view (FoV), can have different SRI durations depending on the use-case and Doppler/mobility requirements over the corresponding parts of the FoV, using some potential prior information regarding the FoV and the environment to be sensed.

Example 10 may include the apparatus of example 1 or some other example herein, wherein SRIs across the sensing block, can have different pattern and/or different number of sensing OFDM symbols.

Example 11 may include the apparatus of example 2 or some other example herein, wherein the cyclic prefix duration $T_{cp}$ in the OFDM symbols for any SCS≥60 KHz, can be configurable from a set of plurality of configurable values, including the value supported in existing or future cellular communication systems, and the sensing block duration is selected to maximize the alignment with communication unit boundaries, with minimum gap between the sensing block boundaries and the communication block boundaries.

Example 12 may include the apparatus of examples 2 and 11 or some other example herein, wherein for SCS=120 KHz with sensing OFDM symbol duration of 9.12 us, in order to address speed requirements resulting in SRI durations on the order of 7*8.92 us, or 14*8.92 us, SRI equal to 6*9.12 us or 13*9.12 us, considering the sensing OFDM symbol duration can be selected, respectively. Then, with k=64, the sensing block duration will be 3.5 msec or 7.6 msec, respectively, which amounts to 393 or 851 communication OFDM symbols, respectively. This means the sensing block duration will be equal to 28 slots and 1 communication OFDM symbol or 60 slots and 11 communication OFDM symbols. As such, the sensing block duration may not end up being an integer number of communication slots, and certain slots may need to accommodate both sensing OFDM symbols and communication OFDM symbols.

Example 13 may include the apparatus of examples 2 and 11 or some other example herein, wherein the sensing block duration is defined in terms of integer number of communication slots. It is possible to allow for a set of values in terms of the number of slots to be defined, from which one value can be configured as the sensing block duration, and let the sensing entity select the sensing symbol duration and the SRI duration within the block, considering the configured total sensing block duration, the carrier frequency, the speed requirements, the FoV requirements, the link budget, etc.

Example 14 may include the apparatus of examples 2 and 11 and 13 or some other example herein, wherein for SCS=120 KHz and 480 KHz, sensing block duration can be configured form the set {2, 4, 8, 16, 32} msec or from the set {32, 64, 128, 256} slots (or any other values, not necessarily powers of 2), and the SRI can be selected accordingly.

Example 15 may include the apparatus of examples 2 and 11 or some other example herein, wherein the main design parameter is the sensing block duration to ensure proper alignment with communication block (as compared against the cases with unified numerology between communication and sensing, wherein the selection of SRI and supported Doppler FFT sizes are the main design parameters).

Example 16 may include the apparatus of example 2, or example 1, or some other example herein, when there is a block of consecutive [contiguous] sensing OFDM symbols within the SRI, wherein the first sensing symbol form the set of contiguous sensing OFDM symbols, can have longer CP duration compared to the rest of the sensing OFDM symbols in the set of contiguous sensing symbols, and the longer CP duration can be the full CP needed to avoid inter-symbol interference (ISI) (e.g., from prior communication OFDM symbol, over which, the sensing beamforming may not have control over), while the sub-sequent symbols can have shorter CP by using spatial separation (between transmission sensing beams) to avoid ISI.

Example 17 may include the apparatus of example 16 or some other example herein, wherein beamforming for the sensing can be controlled by the sensing transmission (e.g., at the base station for network-based sensing) and the sensing entity scans the field of view, such that inter-symbol interference between the adjacent sensing symbols is reduced by proper mapping of the beam directions to the sensing symbol such that beams mapped to adjacent symbols, point to spatially different/uncorrelated directions.

Example 18 may include the apparatus of example 16 or some other example herein, wherein with reduced CP duration, intercarrier interference due to loss of orthogonality, can be handled via time domain processing to reconstruct the original cyclic prefix. In an example of CP reconstruction for two-path signal with delay spread larger than the conventional CP, the second OFDM symbol is attenuated significantly when viewed in the received beam of first OFDM symbol.

Example 19 may include the apparatus of example 16 or some other example herein, wherein at the receiver beamforming may be applied, such that the nulls of the RX beam can be aligned to beam direction of adjacent sensing OFDM symbol in time, e.g., a wide beam, e.g., half FoV beamforming in RX, can be used.

Example 20 may include the apparatus of example 16 or some other example herein, wherein the receiver beamforming is applied before CFAR processing.

Example 21 may include the apparatus of example 16 or some other example herein, wherein the receiver beamforming is applied before element-wise division processing.

Example 22 may include the apparatus of example 16 or some other example herein, wherein if digital beamforming is applied at the transmission, multiple transmit beams can be created for different sub-carriers (or RBs) and speed up the scanning of FoV. On top of that, CP reduction (elimination) of examples 16-21 can be applied on RB-by-RB basis.

Example 23 includes a method, comprising:

receiving sensing modulated symbols that are mapped to time and frequency resources of an Orthogonal Frequency Division Multiplexing (OFDM) resource grid;

mapping communication modulated symbols to time and frequency resources of the OFDM resource grid such that a plurality of OFDM symbols within a symbol repetition interval (SRI) are used to carry a communication signal; and encoding a message for transmission that includes the communication modulated symbols.

Example 24 includes the method of example 23 or some other example herein, wherein a common configurable number OFDM symbols in every SRI within a sensing frame is dedicated for sensing, and wherein every SRI within the sensing frame has a common pattern for distribution of the sensing symbols.

Example 25 includes the method of example 24 or some other example herein, wherein the sensing block includes a fixed pattern of symbols across SRIs in the sensing block.

Example 26 includes the method of example 23 or some other example herein, wherein N OFDM symbols within an SRI are occupied for sensing signal transmission, and wherein a pattern of distribution for the N symbols are different between at least two SRIs within a sensing frame.

Example 27 includes the method of example 26 or some other example herein, wherein an OFDM symbol for a beam is non-uniformly distributed between different SRI intervals.

Example 28 includes the method of example 26 or some other example herein, wherein there is a communication symbol associated with a sensing direction within an SRI, and wherein a selection of symbols within each SRI is based on communication service requirements, packet sizes, or latency/reliability requirements.

Example 29 includes the method of example 23 or some other example herein, wherein different beams covering different parts of a field of view (FoV) have different SRI durations.

Example 30 includes the method of example 23 or some other example herein, wherein SRIs across a sensing block have different patterns or a different number of sensing OFDM symbols.

Example 31 includes the method of any of examples 23-30 or some other example herein, wherein the method is performed by a user equipment (UE) or next-generation NodeB (gNB), or portion thereof.

Example 32 includes an apparatus used in a sensing and communication system wherein the apparatus comprises a processor circuitry configured to cause a sensing entity to map the sensing modulated symbols to time and frequency resources of an Orthogonal Frequency Division Multiplexing (OFDM) resource grid such that the total time span over which recurring OFDM symbols are occupied by the sensing modulated symbols (called sensing frame), is a multiple integer (K) of the periodicity with which such sensing modulated symbols are mapped to OFDM symbols (called $T_{SRI}$ where SRI stands for Symbol Repetition Interval), and transmit the sensing modulated symbols, and a processor circuitry configured to cause a communication entity to map the communication modulated symbols to time and frequency resources of the same OFDM resource grid such that zero or one or a plurality of OFDM symbols within SRI are used to carry communication signal (intra-block-level (intra-SRI-level) TDM), and transmit the communication modulated symbols.

Example 33 may include the apparatus of example 32, and/or some other example herein, wherein the apparatus comprises processor circuitry configured to cause the sensing entity to map and transmit the modulated symbols, according to 5G NR Downlink (DL) Positioning Reference Signal (PRS) design or an extension of the DL PRS signal wherein plurality of the DL PRS configurations are extended compared to 5G NR supported configurations.

Example 34 may include the apparatus of example 33, and/or some other example herein, wherein the DL PRS resource set configuration supports predefined patterns for time domain allocation of the DL PRS resources, and indication to the selected pattern for the particular set being configured.

Example 35 may include the apparatus of example 33, and/or some other example herein, wherein the pattern configuration can be indicated through a bitmap to indicate which symbols within the SRI should be used for transmission of PRS resources. This means that the SRI's pattern (the constructure of the PRS resource set) can be configurable (depending also on the communication service to be multiplexed with sensing), e.g., either from a set of pre-defined patterns, or the configuration can be through a bitmap to indicate which symbols within the SRI should be used for sensing.

Example 36 may include the apparatus of example 33, and/or some other example herein, wherein the configuration of DL PRS (e.g., configuration of DL PRS resource set) includes indication of the number of DL PRS resources and indication of the selected pattern.

Example 37 may include the apparatus of example 33, and/or some other example herein, wherein the DL PRS configuration allows for different number of DL PRS resources and/or different placement/pattern of DL PRS resources within each occurrence of the DL PRS resource set, across the repetition window. For example, the DL PRS resource set configuration allows for indication of a pattern of PRS resources within the set (e.g., from a predefined set, or via bitmap, etc.) for each occurrence of the set within the repetition window. (This means that different repetitions of the set can have different patterns of resources.)

Example 38 may include the apparatus of example 33, and/or some other example herein, wherein the DL PRS configuration allows for different number of symbols per DL-PRS Resource within a slot, for different DL PRS Resources in a DL-PRS Resource Set. For example, a parameter, e.g., dl-PRS-NumSymbols can be defined as part of the parameters describing the DL-PRS resource, rather than the DL PRS resource set.

Example 39 may include the apparatus of example 33, and/or some other example herein, wherein the DL PRS configuration allows for the resource bandwidth and/or the resource comb size being configured per DL PRS resource set, or per DL PRS resource. For example, the respective one or two parameters, e.g., dl-PRS-ResourceBandwidth and/or dl-PRS-CombSizeN are included in the parameters describing the DL PRS resource or resource set.

Example 40 may include the apparatus of example 33, and/or some other example herein, wherein the DL PRS configuration supports configuring special DL PRS resource sets, which occupy back-to-back DL PRS resources/symbols over one or multiple slots (may not necessarily occupy integer number of slots) and the symbols within the special sets (except the first symbol), can have a configurable or predefined CP duration smaller than the CP duration of the first symbol which can also be a part of the PRS configuration. The indication of the special set can be part of the PRS resource set or frequency layer configuration (explicit or implicit). The longer CP duration used for the first symbol can be the full CP needed to avoid inter-symbol interference (ISI) (e.g., from prior communication OFDM symbol, over which, the sensing beamforming may not have control over).

Example 41 may include the apparatus of example 40, and/or some other example herein, wherein the DL PRS configuration also allows for back-to-back repetitions of the special set (repetition gap of zero slot), such that over the entire span of the set repetitions, all symbols are used for the purpose of positioning/sensing (no communication symbol in between). The special set configuration then allows for the larger CP only be configured for the first symbol of the first copy/instance of the set.

Example 42 may include the apparatus of example 41, and/or some other example herein, wherein assuming a repetition gap of zero slot and a repetition factor of M, the configuration of DL PRS allows for configuring CP duration of T_cp_NR+x for the first symbol in the total of M*14 OFDM symbols, and CP duration of T_cp_NR−y for the other M*14−1 symbols such that (T_OFDM_symbol_NR−y)*(M*14−1)=32*500.04 us−(T_OFDM_symbol_NR+x) us. Alternatively, DL PRS allows for configuring CP duration of T_cp_NR+x for the first symbol in every slot across the M slots, and CP duration of T_cp_NR−y for the other symbols such that (T_OFDM_symbol_NR−y)*M*(14−1) =32*500.04 us−M*(T_OFDM_symbol_NR+x) us.

Example 43 may include the apparatus of any of examples 32-42, and/or some other example herein, wherein same configurable number N≥1 OFDM symbols in (each and every) SRI within sensing frame is dedicated for sensing is supported as the baseline, with the same or configurable pattern for distribution of the sensing symbols across SRIs within a sensing frame. The configuration also allows for different number of sensing symbols across SRIs.

Example 44 may include the apparatus of any of examples 32-43, and/or some other example herein, wherein the apparatus supports time intervals, e.g., in granularity of slots, subframes, frames, or a non-integer multiple of any of these time units, over which the base station performs any user-device-transparent transmit and/or receive processing, while the user devices is also able to perform its required processing or measurements, and within these intervals the OFDM symbol duration used for sensing may not be aligned with what is defined and used for communication. For example, certain CP durations (larger than what used for communication, for SCSs>=120 KHz) can be configured only when such intervals are to be indicated. The indication of such intervals is explicit via any control signaling such as RRC, MAC CE, or DCI, or implicit via certain configurations of CP duration, etc.

Example 45 may include the apparatus of example 33, example 44, and/or some other example herein, wherein for SCS>=120 KHz, the CP duration for DL-PRS signal is configurable depending on the sensing detection range requirements (e.g., from a predefined set including the CP duration used for communication, as well as other larger value(s)), while the OFDM symbol duration is kept the same for all different CP durations (e.g., it equals 8.92 us for SCS=120 KHz as the current value in NR or other values). For example, for SCS=120 KHz, a set of CP durations including the existing value of 0.59 us, and one or more larger values (e.g., 0.69 us (for ~100 m range detection), 0.79 us (for ~118 m range detection), or any other value) can be defined, and the configuration can indicate one of the predefined values per PRS resource or per PRS resource set.

Example 46 may include the apparatus of example 33, example 44, and/or some other example herein, wherein the DL-PRS configuration also supports configuration of SCS=240 KHz or SCS=480 KHz, over FR2.

Example 47 may include the apparatus of example 33, example 44, and/or some other example herein, wherein for SCS>=60 KHz, the DL-PRS configuration supports configuring CP duration, e.g., from a set of few options, such that the overall OFDM symbol duration also varies based on the CP duration. This includes support of extended CP (ECP) also for SCS>=120 KHz.

Example 48 may include the apparatus of example 47, and/or some other example herein, wherein the ECP calculation for SCS=120 KHz can be such that 4 slots of normal CP (with one large CP every 4 slots) with 14 OFDM symbols per slot, equals 4 slots of extended CP with 12 OFDM symbols per slot.

Example 49 may include the apparatus of example 47, and/or some other example herein, wherein for SCS>=60, the extended CP is defined such one or multiple of following are boundary aligned: half slot of NCP symbols and ECP symbols, full slot of NCP symbols and ECP symbols, an integer number of ECP OFDM symbols and another integer number of NCP OFDM symbols, where these integer numbers may not be an integer multiple of slot durations in number of OFDM symbols, half subframes, subframes, or radio frames.

Example 50 may include the apparatus of example 49, and/or some other example herein, wherein DL PRS resources of one or multiple DL PRS resource sets can be configured over the ECP OFDM symbols in these boundary-aligned durations, and each DL PRS resource can span over 1 or multiple consecutive ECP OFDM symbols. The DL PRS resource set can be configured such that it contains the required number of DL PRS resources to scan the desired field of view over one instance of the set, and the set is repeated within the boundary aligned duration or an integer multiple of this duration. Any of the ECP symbols can also be used for transmission of other communication signals.

Example 51 may include the apparatus of example 47, and/or some other example herein, wherein for SCS>=120 KHz, every m normal CP (NCP) symbols (e.g., m can be chosen to align with a subframe or frame boundary or some other time unit), are matched to every n (newly defined) extended CP symbols (where both NCP and ECP can be different (larger) for the first symbols within m and n symbols, respectively).

Example 52 may include the apparatus of example 47, and/or some other example herein, wherein instead of all PRS resource sets defined in the PRS positioning frequency layer being configured with common SCS and common CP, one or both of these parameters are configured per DL PRS resource set, or per DL PRS resource, or per slot. For example, the parameter dl-PRS-CyclicPrefix and/or the parameter dl-PRS-SubcarrierSpacing are amongst the parameters describing the DL PRS resource or the DL PRS resource set.

Example 53 may include the apparatus of example 52, and/or some other example herein, wherein for configuration of each PRS resource set, a vector of the length equal to the number of spanned slots is defined, each element of the vector showing the type of CP over each of the spanned slots. The configuration of CP can be an indication of an index to a value from a larger set of predefined values.

Example 54 may include the apparatus of example 47, and/or some other example herein, wherein slots containing PRS symbols can be configured with different CP durations for different symbols from a predefined set of values, such that subsets of symbols have a different CP.

Example 55 may include the apparatus of example 33, example 44, and/or some other example herein, wherein the DL-PRS configuration allows for configuring DL PRS resource set with back-to-back length-1-symbol DL PRS resources, wherein the same PRS sequence is mapped to all the PRS resources, and only the first symbol (first DL-PRS resource) within the sensing frame (i.e., the repetition window of the set, containing all the repetitions of the set) is configured with a CP, while all other symbols (DL-PRS resources and their repetitions) are configured with zero CP. For this special configuration, the repetition gap is zero, i.e., all the repetitions of the set are back-to-back.

Example 56 may include a method to be performed by a user equipment (UE), one or more elements of a UE, and/or one or more electronic devices that include and/or implement a UE, wherein the method comprises: identifying, from a base station (BS), a cellular transmission that includes a symbol repetition interval (SRI) composed of a plurality of orthogonal frequency division multiplexed (OFDM) symbols; identifying, in the SRI, that a first subset of the plurality of OFDM symbols of the SRI are related to sensing to be performed by the UE; and identifying, in the SRI, that a second subset of the plurality of OFDM symbols of the SRI are related to data.

Example 57 may include the method of example 56, and/or some other example herein, wherein the first subset includes 10 OFDM symbols, 5 OFDM symbols, or 2 OFDM symbols.

Example 58 may include the method of any of examples 56-57, and/or some other example herein, wherein the second subset includes 10 OFDM symbols, 5 OFDM symbols, or 2 OFDM symbols.

Example 59 may include the method of any of examples 56-58, and/or some other example herein, wherein the SRI is composed of a 20 OFDM symbols.

Example 60 may include the method of any of examples 56-59, and/or some other example herein, wherein the first subset of the plurality of OFDM symbols is interleaved with the second subset of the plurality of OFDM symbols.

Example 61 may include the method of example 60, and/or some other example herein, wherein the first subset of the plurality of OFDM symbols is interleaved in a time domain with the second subset of the plurality of OFDM symbols.

Example 62 may include the method of any of examples 56-61, and/or some other example herein, wherein the SRI is related to a downlink positioning reference signal (DL-PRS).

Example 63 may include a method to be performed by a base station (BS), one or more elements of a BS, and/or one or more electronic devices that include and/or implement a BS, wherein the method comprises: identifying a first subset of a plurality of OFDM symbols related to sensing to be performed by a user equipment (UE); identifying a second subset of the plurality of OFDM symbols related to data; generating a cellular transmission that includes a symbol repetition interval (SRI) composed of the first subset and the second subset of the plurality of OFDM symbols; and transmitting the cellular transmission to the UE.

Example 64 may include the method of example 63, and/or some other example herein, wherein the first subset includes 10 OFDM symbols, 5 OFDM symbols, or 2 OFDM symbols.

Example 65 may include the method of any of examples 63-64, and/or some other example herein, wherein the second subset includes 10 OFDM symbols, 5 OFDM symbols, or 2 OFDM symbols.

Example 66 may include the method of any of examples 63-65, and/or some other example herein, wherein the SRI is composed of a 20 OFDM symbols.

Example 67 may include the method of any of examples 63-66, and/or some other example herein, further comprising interleaving the first subset of the plurality of OFDM symbols with the second subset of the plurality of OFDM symbols.

Example 68 may include the method of example 67, and/or some other example herein, further comprising interleaving the first subset of the plurality of OFDM symbols with the second subset of the plurality of OFDM symbols in a time domain.

Example 69 may include the method of any of examples 63-68, and/or some other example herein, wherein the SRI is related to a downlink positioning reference signal (DL-PRS).

Example 70 may include a method to be performed by an electronic device in a cellular network, wherein the method comprises: identifying a plurality of downlink positioning reference signal (DL-PRS) symbols related to sensing to be performed during a sensing operation; identifying a plurality of orthogonal frequency division multiplexed (OFDM) symbols related to data; generating a cellular transmission that includes a symbol repetition interval (SRI) composed of the plurality of DL-PRS symbols and the plurality of OFDM symbols; and transmitting the cellular transmission.

Example 71 may include the method of example 70, and/or some other example herein, wherein the plurality of DL-PRS symbols is a first plurality of DL-PRS symbols, and wherein the SRI further includes a second plurality of DL-PRS symbols, and wherein the plurality of OFDM symbols is positioned between the first and second plurality of DL-PRS symbols in the time domain.

Example 72 may include the method of any of examples 70-71, and/or some other example herein, wherein the method further comprises transmitting, prior to transmission of the cellular transmission, an indication of positioning reference signal (PRS) configuration related to the SRI.

Example 73 may include the method of example 72, and/or some other example herein, wherein the PRS configuration relates to configuration of a different number or time-domain allocation of PRS resources in respective occurrences of PRS resource sets of a plurality of PRS resource sets within a PRS resource set repetition window.

Example 74 may include the method of any of examples 72-73, and/or some other example herein, wherein the PRS configuration relates to configuration of PRS resource bandwidth being per PRS resource set, a per PRS resource, or per slot.

Example 75 may include the method of any of examples 72-74, and/or some other example herein, wherein the PRS configuration relates to configuration of a PRS resource comb size being per PRS resource set, per PRS resource, or per slot.

Example 76 may include the method of any of examples 72-75, and/or some other example herein, wherein the PRS configuration relates to configuration of a cyclic prefix (CP) duration being per PRS resource, per PRS resource set, or per slot.

Example 77 may include the method of any of examples 72-76, and/or some other example herein, wherein the PRS configuration relates to configuration of a cyclic prefix (CP) selected from a set of predefined values that are related to a subcarrier spacing (SCS) of greater than or equal to 120 kilohertz (KHz).

Example 78 may include the method of any of examples 72-77, and/or some other example herein, wherein the PRS configuration relates to configuration of a spacing (SCS) being per PRS resource, per DL PRS resource set, or per slot.

Example 79 may include the method of any of examples 72-78, and/or some other example herein, wherein the PRS configuration relates to configuring a PRS resource set repetition window that does not include communication symbols, wherein within the PRS resource set repetition window an OFDM symbol duration and a cyclic prefix (CP) duration is different than an OFDM symbol duration and a CP duration that is used for data.

Example Z01 may include an apparatus comprising means to perform one or more elements of a method described in or related to any of examples 1-79, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-79, or any other method or process described herein.

Example Z03 may include an apparatus comprising logic, modules, or circuitry to perform one or more elements of a method described in or related to any of examples 1-79, or any other method or process described herein.

Example Z04 may include a method, technique, or process as described in or related to any of examples 1-79, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-79, or portions thereof.

Example Z06 may include a signal as described in or related to any of examples 1-79, or portions or parts thereof.

Example Z07 may include a datagram, packet, frame, segment, protocol data unit (PDU), or message as described in or related to any of examples 1-79, or portions or parts thereof, or otherwise described in the present disclosure.

Example Z08 may include a signal encoded with data as described in or related to any of examples 1-79, or portions or parts thereof, or otherwise described in the present disclosure.

Example Z09 may include a signal encoded with a datagram, packet, frame, segment, protocol data unit (PDU), or message as described in or related to any of examples 1-79, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-79, or portions thereof.

Example Z11 may include a computer program comprising instructions, wherein execution of the program by a processing element is to cause the processing element to carry out the method, techniques, or process as described in or related to any of examples 1-79, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| 3GPP | Third Generation Partnership Project |
|---|---|
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBD | Candidate Beam Detection |

-continued

| | |
|---|---|
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Description |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Ratio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |

-continued

| | |
|---|---|
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Nex Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |

-continued

| | |
|---|---|
| GTP | GPRS Tunneling Protocol |
| GRP-UGPRS | Tunnelling Protocol for User Plane |
| GTS | Go To Sleep Signal (related to WUS) |
| GUMMEI | Globally NodeB Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |

-continued

| | |
|---|---|
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/ encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |

-continued

| NFP | Network Forwarding Path |
|---|---|
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT Point over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |

-continued

| PRR | Packet Reception Radio |
|---|---|
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSFCH | physical sidelink feedback channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |

| | |
|---|---|
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |

| | |
|---|---|
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report TRP, TRxP Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), descision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. One or more non-transitory computer-readable media (NTCRM) comprising instructions that, upon execution of the instructions by one or more processors of an electronic device in a cellular network, are to cause the electronic device to:

identify a plurality of downlink positioning reference signal (DL-PRS) symbols related to sensing to be performed during a sensing operation;

identify a plurality of orthogonal frequency division multiplexed (OFDM) symbols related to data;

generate a cellular transmission that includes a symbol repetition interval (SRI) composed of the plurality of DL-PRS symbols and the plurality of OFDM symbols; and transmit the cellular transmission.

2. The one or more NTCRM of claim 1, wherein the plurality of DL-PRS symbols is a first plurality of DL-PRS symbols, and wherein the SRI further includes a second plurality of DL-PRS symbols, and wherein the plurality of OFDM symbols is positioned between the first and second plurality of DL-PRS symbols in the time domain.

3. The one or more NTCRM of claim 1, wherein the instructions are further to cause the electronic device to transmit, prior to transmission of the cellular transmission, an indication of positioning reference signal (PRS) configuration related to the SRI.

4. The one or more NTCRM of claim 3, wherein the PRS configuration relates to configuration of a different number or time-domain allocation of PRS resources in respective occurrences of PRS resource sets of a plurality of PRS resource sets within a PRS resource set repetition window.

5. The one or more NTCRM of claim 3, wherein the PRS configuration relates to configuration of PRS resource bandwidth being per PRS resource set, a per PRS resource, or per slot.

6. The one or more NTCRM of claim 3, wherein the PRS configuration relates to configuration of a PRS resource comb size being per PRS resource set, per PRS resource, or per slot.

7. The one or more NTCRM of claim 3, wherein the PRS configuration relates to configuration of a cyclic prefix (CP) duration being per PRS resource, per PRS resource set, or per slot.

8. The one or more NTCRM of claim 3, wherein the PRS configuration relates to configuration of a cyclic prefix (CP) selected from a set of predefined values that are related to a subcarrier spacing (SCS) of greater than or equal to 120 kilohertz (KHz).

9. The one or more NTCRM of claim 3, wherein the PRS configuration relates to configuration of a spacing (SCS) being per PRS resource, per DL PRS resource set, or per slot.

10. The one or more NTCRM of claim 3, wherein the PRS configuration relates to configuring a PRS resource set repetition window that does not include communication symbols, wherein within the PRS resource set repetition window an OFDM symbol duration and a cyclic prefix (CP) duration is different than an OFDM symbol duration and a CP duration that is used for data.

11. An electronic device comprising:
one or more processors configured to:
identify a plurality of downlink positioning reference signal (DL-PRS) symbols related to sensing to be performed during a sensing operation;
identify a plurality of orthogonal frequency division multiplexed (OFDM) symbols related to data; and
generate a cellular transmission that includes a symbol repetition interval (SRI) composed of the plurality of DL-PRS symbols and the plurality of OFDM symbols; and
a memory to store the cellular transmission.

12. The electronic device of claim 11, wherein the plurality of DL-PRS symbols is a first plurality of DL-PRS symbols, and wherein the SRI further includes a second plurality of DL-PRS symbols, and wherein the plurality of OFDM symbols is positioned between the first and second plurality of DL-PRS symbols in the time domain.

13. The electronic device of claim 11, wherein the one or more processors are further to facilitate transmission, prior to transmission of the cellular transmission, of an indication of positioning reference signal (PRS) configuration related to the SRI.

14. The electronic device of claim 13, wherein the PRS configuration relates to configuration of a different number or time-domain allocation of PRS resources in respective occurrences of PRS resource sets of a plurality of PRS resource sets within a PRS resource set repetition window.

15. The electronic device of claim 13, wherein the PRS configuration relates to configuration of PRS resource bandwidth being per PRS resource set, a per PRS resource, or per slot.

16. The electronic device of claim 13, wherein the PRS configuration relates to configuration of a PRS resource comb size being per PRS resource set, per PRS resource, or per slot.

17. The electronic device of claim 13, wherein the PRS configuration relates to configuration of a cyclic prefix (CP) duration being per PRS resource, per PRS resource set, or per slot.

18. The electronic device of claim 13, wherein the PRS configuration relates to configuration of a cyclic prefix (CP) selected from a set of predefined values that are related to a subcarrier spacing (SCS) of greater than or equal to 120 kilohertz (KHz).

19. The electronic device of claim 13, wherein the PRS configuration relates to configuration of a spacing (SCS) being per PRS resource, per DL PRS resource set, or per slot.

20. The electronic device of claim 13, wherein the PRS configuration relates to configuring a PRS resource set repetition window that does not include communication symbols, wherein within the PRS resource set repetition window an OFDM symbol duration and a cyclic prefix (CP) duration is different than an OFDM symbol duration and a CP duration that is used for data.

* * * * *